United States Patent
Okamoto et al.

(10) Patent No.: US 6,608,660 B1
(45) Date of Patent: Aug. 19, 2003

(54) LIQUID CRYSTAL DISPLAY DEVICE INCLUDING SHADING FILM WITH OPENING AND REFLECTOR WITH OPENING IN THE OPENING IN THE SHADING FILM

(75) Inventors: Eiji Okamoto, Matsumoto (JP); Takumi Seki, Misato-mura (JP); Keiji Takizawa, Hotaka-machi (JP)

(73) Assignee: Seiko Epson Corporation (JP)

( * ) Notice: Subject to any disclaimer, the term of this patent is extended or adjusted under 35 U.S.C. 154(b) by 56 days.

(21) Appl. No.: 09/787,355

(22) PCT Filed: Jul. 11, 2000

(86) PCT No.: PCT/JP00/04636
§ 371 (c)(1),
(2), (4) Date: Mar. 15, 2001

(87) PCT Pub. No.: WO01/06308
PCT Pub. Date: Jan. 25, 2001

(30) Foreign Application Priority Data

Jul. 16, 1999 (JP) .......................... 11-203635

(51) Int. Cl.⁷ .................... G02F 1/1335; G02F 1/1333
(52) U.S. Cl. ................. 349/113; 349/106; 349/110; 349/111; 349/112; 349/114; 349/122
(58) Field of Search ................. 349/112, 110, 349/111, 106, 113, 114, 122, 129

(56) References Cited

U.S. PATENT DOCUMENTS 5,680,188 A * 10/1997 Yoshida et al. ............. 349/113
5,929,956 A * 7/1999 Neijzen et al. ............. 349/113
6,352,804 B1 * 3/2002 Sakamoto et al. ............. 430/7

FOREIGN PATENT DOCUMENTS

| CN | 1222718 A | 7/1999 |
|---|---|---|
| EP | 0 903 613 A1 | 3/1999 |
| JP | 62-250416 | 10/1987 |
| JP | 07-028055 | 1/1995 |
| JP | 08-160462 | 6/1996 |
| JP | 08-286178 | 11/1996 |
| JP | 09-049906 | 2/1997 |
| JP | 11-52366 | 2/1999 |
| JP | 11-160698 | 6/1999 |

* cited by examiner

*Primary Examiner*—Tarifur R. Chawdhury
(74) *Attorney, Agent, or Firm*—Harness, Dickey & Pierce, P.L.C.

(57) ABSTRACT

In a color liquid crystal display device capable of performing reflective display, in order to realize superior display quality and high reliability, a reflector (2), a shading film (13), a coloring layer (4), a protective film (6), and a transparent electrode (7) are sequentially formed on a substrate (1) having insulating properties. Among the films and layers mentioned above, the coloring layer (4) is formed so as to cover the reflector (2), whereby the reflector (2) does not come into contact with chemical reagents and the like. In addition, since the coloring layer (4) is formed so as to cover the shading film (13), surface reflection at the shading film (13) is not only suppressed, but also, an optical density required for the shading film (13) can be less. In particular, since light passes through the shading film twice in reflective display, when reflective display is primarily performed, the optical density of the shading film (13) can be even less. Accordingly, the thickness of the shading film (13) can be decreased.

29 Claims, 17 Drawing Sheets

LIQUID CRYSTAL DISPLAY DEVICE INCLUDING SHADING FILM WITH OPENING AND REFLECTOR WITH OPENING IN THE OPENING IN THE SHADING FILM

TECHNICAL FIELD

The present invention relates to liquid crystal display devices in which a reflector and coloring layers are provided on a surface of a substrate at a liquid crystal layer side, electronic apparatuses provided with the liquid crystal display devices, and substrates for use in the liquid crystal display devices.

BACKGROUND ART

Hitherto, due to low power consumption characteristics, reflective liquid crystal display devices have been used for mobile information terminals and the like. In particular, concomitant with the recent increase in the communication of image information, movement towards color reflective liquid crystal display devices is in progress.

In liquid crystal display devices, by providing a reflector on an exterior surface or an interior surface of a liquid crystal layer, a reflective liquid crystal display device can be constructed. However, it is believed that the reflector is preferably provided on the interior surface of the liquid crystal layer since decrease in display quality, such as double images by parallax and color blurring, can be avoided. For example, in active matrix liquid crystal display devices, when pixel electrodes are also used as a reflector by providing reflective properties to the pixel electrodes formed at a substrate provided with switching elements, a reflective color liquid crystal display device can be realized in which decrease in display quality can be avoided.

Recently, in order to ensure visibility in dark environments, there is a proposal in which a transflective liquid crystal display device capable of performing both reflective display and transmissive display is constructed by forming a reflector which not only reflects light but also transmits light. According to the transflective liquid crystal display device as described above, reflective display is performed in normal conditions in which power consumption is low, and when necessary, transmissive display is performed in dark environments, whereby visibility can be ensured.

However, in an arrangement in which pixel electrodes are also used as a reflector, aluminum generally used as a reflector is exposed in manufacturing steps. Since aluminum has poor corrosion resistance, as is well known, in the arrangement described above, damage will be done to the aluminum, and hence, reflective properties as a reflector and electrical properties as electrodes may be degraded in some cases.

For example, among manufacturing processes for liquid crystal display devices, a process for forming an alignment film includes a step of coating a solution primarily composed of a polyimide resin or a polyamic acid dissolved in a polar solvent, such as N-methyl pyrrolidone (1-methyl-2-pyrrolidinone) or γ-butyrolactone (4-hydroxy butyric acid γ-lactone) and a following step of heating to 150 to 250° C. Accordingly, the probability of damaging the aluminum is high.

In addition, when the other electrodes opposing the reflective electrodes are formed of ITO (Indium Tin Oxide), a difference in polarity is generated between the aluminum electrode and the ITO electrode with the liquid crystal layer provided therebetween, and hence, long term reliability of the liquid crystal display device and display quality thereof are both degraded. These phenomena described above also occur when an aluminum alloy containing other atoms is used, even though the degree thereof may be different to some extent.

In the transflective liquid crystal display device described above, when transmissive display is performed, the contrast ratio is significantly decreased by light leakage from areas other than pixels, and hence, high quality display cannot be performed. In order to prevent a decrease in the contrast ratio due to light leakage, a shading layer may be additionally provided on a substrate opposing a substrate provided with a reflector, i.e., a substrate closer to an observer.

As a shading film, chromium or a black resin material is usually used. Among the materials mentioned above, chromium has high shading properties and can be formed to a thickness of 200 nm or less; however, since chromium is a metal material, the surface reflectance thereof is high. For example, the reflectance of monolayer chromium is high, such as approximately 60%, and the reflectance of low reflectance two-layer chromium is approximately 7%. Accordingly, when chromium is used for a shading film, since light incident from the observer side reflects at the surface of the shading film, there is a problem in that the contrast ratio in reflective display is decreased.

On the other hand, since a black resin material has a low reflectance, surface reflectance can be suppressed; however, since the shading properties of the black resin material is poor, in order to maintain an optical density of 2 or more which is required for transmissive display, the black resin material must be formed to be thick. Consequently, there are problems in that the flatness of the substrate is degraded, and since patterned width cannot be small, the opening area ratio is decreased as a result.

SUMMARY OF THE INVENTION

In consideration of the situation described above, the present invention is completed, and an object thereof is to provide a liquid crystal display device having superior reflective properties and high display quality, an electronic apparatus, and a substrate for use in the liquid crystal display device.

To these ends, the liquid crystal display device according to a first invention having a liquid crystal layer provided between a first transparent electrode formed at a first substrate side and a second transparent electrode formed at a second substrate side, comprises a reflector formed on a surface of the second substrate at the liquid crystal layer side so as to reflect at least light incident from the first substrate side, a shading film formed above the surface at the second substrate at the liquid crystal layer side so as to have an opening area corresponding to an intersection area at which the first transparent electrode and the second transparent electrode intersect each other, and a coloring layer formed above the surface of the second substrate at the liquid crystal layer side so as to cover the shading film.

According to the first invention, since the liquid crystal layer is provided between the first and the second transparent electrodes composed of the same type of material, the display quality and the long-term reliability of the liquid crystal display device are not degraded. In addition, on the reflector, since the shading film and the coloring layer are formed, so that the reflector is not to be exposed.

Accordingly, in a manufacturing process of the liquid crystal display device, since the reflector will not be exposed to chemical reagents, gases, liquid crystal, and the like, damage done to the reflector can be avoided. Furthermore, since the coloring layer is formed so as to cover the shading film, the surface reflection at the shading film can be suppressed, and in addition, an optical density required for the shading film can be less. In particular, since light passes through the shading film twice in reflective display, even if the optical density is less, sufficient shading properties in practical use can be obtained when reflective display is primarily performed.

In the first invention, in the opening areas in the shading film, the reflector is preferably provided with first openings at which light passes therethrough. In the structure mentioned above, since the reflector will not function as an electrode, that is, since liquid crystal layer even at the first openings in the reflector is driven by the second transparent electrode, transmissive display can be performed by light passing through the openings. In transmissive display, since light is not determined by the opening areas in the shading film but is determined by the first openings provided in the reflector, an optical density required for the shading film can be determined only in consideration of reflective display.

In the first invention, the structure is preferable in which a first film is provided between the reflector and the surface of the second substrate at the liquid crystal layer side. According to the structure mentioned above, even if the adhesiveness between a metal material used as the reflector and the surface of the second substrate is inferior, the adhesiveness of the reflector can be improved by the first film. As the first film that improves the adhesiveness of the reflector, metals, oxides, and nitrides can be used. As the metals, transition metals included in Groups Vb to VIb, such as Ta, Cr, Mo, and W, are mentioned. As examples of the oxides, oxides of the transition metals mentioned above, such as $Ta_2O_5$, silicon oxides such as $SiO_2$, and the like are mentioned, and as other examples of the oxides, $TiO_2$, $ZrO_2$, $SiO_2$ optionally combined with the oxides mentioned above, $Al_2O_3$, and the like are mentioned. In addition, as examples of nitrides, silicon nitrides represented by $Si_3N_4$ are mentioned. Since the first film is used for improving adhesiveness of the reflector, a thickness of approximately 100 nm or, depending on the case, 30 to 60 nm is sufficient. In addition, when a film having no conductance, such as a $SiO_2$ film or a $Ta_2O_5$ film, is used, since the first film may remain over the entire surface of the second substrate, the first film may not be patterned. For example, when silver or an alloy primarily composed of silver is used as the reflector, and when glass is used as the second substrate, a film composed of Mo, $Ta_2O_5$, $SiO_2$, or the like is preferably used as the first film which improves adhesiveness. When a substrate having flexibility, such as a plastic film, is used as the substrate, a $SiO_2$ film, $TiO_2$, $ZrO_2$, $SiO_2$ optionally combined these oxides mentioned above, or the like is preferably used as the first film.

In the first invention, the shading film is preferably composed of a black resin material. As the black resin material mentioned above, for example, a color resist containing a black pigment dispersed therein and a printable black painting material are mentioned. The black resin material described above is superior to chromium in terms of low reflectance but is inferior thereto in terms of shading properties. However, in the first invention, since the optical density of the shading film can be less as described above, the shading film need not be formed thick. For example, when transmissive display is only considered, an optical density of 2 or more is required for the shading film, and in order to achieve the optical density mentioned above by a black resin material, a thickness of approximately 0.9 μm is required. On the other hand, in the first invention, since the coloring layer is formed so as to cover the shading film, light passes through the shading film twice, and light is determined by the first openings in the reflector in transmissive display, the thickness required can be 0.5 μm or less even when a black resin material is used for the shading film, that is, the thickness thereof can be decreased by approximately half. Accordingly, in the first invention, when a black resin material is used for the shading film, the flatness of the substrate is not degraded, and the opening area ratio is not decreased. In this connection, in general, since the contrast ratio of a reflective liquid crystal display device is approximately 1:10 to 1:25, and this ratio is less than that of transmissive liquid crystal display device, the optical density can be decreased in accordance with a liquid crystal display mode to be used, and the thickness of a black resin material can be even decreased.

In the first invention, the shading film is preferably formed by laminating the coloring layers of at least two colors. According to the shading film mentioned above, an additional film need not be formed as the shading film, and hence, cost reduction can be performed. Since the density of a coloring layer for use in a common reflective liquid crystal display device is low compared to that for use in a transmissive liquid crystal display device, even if coloring layers of at least two colors are laminated with each other, the optical density thereof may be 1 or less in some cases, and hence, a required optical density is difficult to obtain. On the other hand, in the arrangement described above, since light in reflective display passes through the shading film twice which is formed by laminating coloring layers of at least two colors, and since light in transmissive display is determined by the first openings in the reflector, sufficient shading properties can be obtained even if coloring layers having low color densities are used. For example, when there are coloring layers having colors, R (red), G (green), and B (blue), and when the optical density of the shading film is 0.7 which is formed by laminating these coloring layers of three colors, the practical optical density is approximately 1.4 since light passes therethrough twice, and hence, sufficient shading properties in practical use can be obtained for a reflective liquid crystal display device generally having a contrast ratio of 1 to 25 or less.

In addition, in the case in which the shading film is composed of the coloring layers of at least two colors, a coloring layer having high color density may be provided at parts of the opening areas in the shading film at a certain ratio, and an average density of light reflected and colored in the opening areas in the shading film may be set to be a value preferable in reflective display. In the arrangement described above, since an area at which coloring layers having high color densities are laminated with each other is used as the shading film, the optical density of the shading film can be even increased. For example, when an optical density is 1.6 at an area at which coloring layers of three colors are laminated with each other, since a practical optical density thereof reaches approximately 3.0 due to light passing through the shading film twice, reflective display can be performed which has a high contrast ratio of 1 to 100 or more.

In the first invention described above, the optical density of the shading film (by light passing once) is preferably 0.5 to 1.7. The reason for this is that, in the first invention, since light passes through the shading film twice in reflective display, as described above, even if the optical density thereof is less, the practical optical density (by light passing twice) is increased.

In the first invention, it is preferable that, with respect to the intersection area of the first transparent electrode and the second transparent electrode, the opening area in the shading film be expanded toward the outside from the periphery of the intersection area by at most approximately a half of the distance between the first transparent electrode and the second transparent electrode.

In a liquid crystal display device, a pixel in a design is an area at which the first transparent electrode and the second transparent electrode intersect each other in plan view; however, there is an area outside the pixel in the design at which liquid crystal molecules are driven by an oblique electric field. In particular, it was confirmed by the inventor of the present invention that liquid crystal molecules in a specific area was driven by an oblique electric field, in which the specific area was in areas of the first and the second transparent electrodes and was outside the intersection area thereof by approximately half of the distance (thickness of the liquid crystal layer) between the electrodes from the periphery of the intersection area. For example, when the distance between electrodes is 4.0 µm in some liquid crystal display mode, liquid crystal molecules are driven which are in an area extending toward the outside from the edge of the electrode by approximately 2.0 µm. Accordingly, when the opening area in the shading film is expanded to an area corresponding to the area described above so that the reflector reflects light, the practical opening area ratio can be increased.

For example, in the case of a liquid crystal display device employing a normally black liquid crystal display mode in which black display is performed when no voltage is applied, when white display is performed by applying voltage, even in an area which is outside the periphery of the pixel in a design to some extent, the liquid crystal molecules in the area are driven by an oblique electric field. Accordingly, by disposing the reflector at the area mentioned above without providing the shading film, an area functioning as a pixel in practice is increased more than that of the pixel in the design, whereby the opening area ratio is increased, and bright display can be realized.

On the other hand, even in the area of the pixel in the design, there is an area at which liquid crystal molecules are not driven by an oblique electric field. In the area mentioned above, when the shading film is provided so that light is not reflected by the reflector, decrease in contrast ratio can be avoided. For example, in a liquid crystal display device employing normally white display mode in which white display is performed when no voltage is applied, when the reflector is disposed at an area at which liquid crystal molecules are not driven without providing the shading film, since a completely black display cannot be performed even when black display is performed by applying voltage, the contrast ratio is decreased. However, when the shading film is provided so as to cover the area described above, decrease in contrast ratio can be avoided.

In addition, in the case of a liquid crystal display device employing a normally white liquid crystal display mode using super twisted nematic (STN) liquid crystal, the contrast may be decreased in some cases due to a phenomenon in which, even when black display is performed in a pixel, an area remains at which liquid crystal is not totally driven at some side of the periphery of the pixel in a design by an effect of an oblique electric field. However, when the reflector and the electrode are separately provided, as is the case with the first invention, decrease in contrast ratio can be avoided by covering the area described above by the shading film. Furthermore, when the reflector is disposed without providing the shading film at the area at which liquid crystal molecules are driven by an oblique electric field even though they are outside the pixel, the practical opening area ratio is increased, and hence, bright display can be performed.

The prevention of decrease in contrast ratio and the practical increase in opening area ratio described above can first be achieved by separately providing the reflector and the pixel electrode, as described in the first invention. Accordingly, description of the points described above will again be made with reference to figures. FIG. 19A is a schematic plan view showing a passive matrix liquid crystal display device using STN liquid crystal, FIG. 19B is a view showing an aligned direction of liquid crystal molecules in the vicinity of the substrate and an aligned direction of bulk liquid crystal molecules in the liquid crystal layer. FIG. 19C is a schematic cross-sectional view taken along the line GG–GG' in FIG. 19A when no voltage is applied, and FIG. 19D is a schematic cross-sectional view taken along the line GG–GG' in FIG. 19A when a voltage is applied.

As shown in FIG. 19A, in a passive matrix liquid crystal display device, an area at which a transparent electrode 22 provided at an upper substrate 21 and a transparent electrode 32 provided at a lower substrate 31 opposing each other intersect each other in plan view is an area 50 of a pixel in a design. As shown in FIG. 19B, the case is assumed in which a counterclockwise STN liquid crystal display mode is employed by a combination of a rubbing direction 23 at the upper substrate 21 and a rubbing direction 33 at the lower substrate 31. In this case, liquid crystal molecules 41 in the vicinity of the upper substrate 21 are aligned along the rubbing direction 23 at the upper substrate 21, and liquid crystal molecules 42 in the vicinity of the lower substrate 31 are aligned along the rubbing direction 33 at the lower substrate 31, and bulk liquid crystal molecules 43 in a liquid crystal layer 40 are aligned so as to be orthogonal to the direction in which electrodes 32 at the lower substrate 31 are formed.

When no voltage is applied, as shown in FIG. 19C, bulk liquid crystal molecules 43 in the liquid crystal layer 40 consistently align, and when a voltage is applied, as shown in FIG. 19D, electric flux lines 53 generated between the electrodes 22 at the upper substrate 21 and the electrodes 32 at the lower substrate 31 are distorted at the peripheries of the pixels (that is, generation of "oblique electric field"), the alignment of the bulk liquid crystal molecules 43 in the liquid crystal layer 40 fall into disorder at one edge of each pixel 53, whereby reverse tilt domains are generated, and areas 51 appear at which the bulk liquid crystal molecules 43 are not normally driven. On the other hand, at the other side of the electrode, areas 52 appear at which the bulk liquid crystal molecules 43, which are even outside the electrodes 32 at the lower substrate 31, are driven.

Accordingly, when the shading layer is formed so as to extend to areas corresponding to the areas 51 at which liquid crystal molecules 43 are not normally driven, and when the reflector is formed without providing the shading film at areas corresponding to the areas 52 at which liquid crystal molecules 43 are normally driven, the practical opening area ratio can be increased without decreasing the contrast ratio, whereby bright display can be performed. Improvement in performances described above cannot be realized by a conventional structure in which electrodes are provided with reflective properties, and it can first be realized by forming the reflector separately from the pixel electrodes, as described in the first invention.

In the first invention, as the reflector, an alloy primarily composed of aluminum, silver, chromium, or the like, or a metal can be used. When an alloy primarily composed of aluminum is used as a reflector, a reflector having high reflectance can be realized at a lower manufacturing cost. In this case, the content of aluminum in the alloy is preferably 80 wt % or more. In addition, when an alloy primarily composed of silver is used as a reflector, significantly high reflectance can be realized. In this case, the content of silver in the alloy is preferably 80 wt % or more.

Furthermore, as the second substrate, a substrate having flexibility, such as a plastic film, can be used. When the substrate having flexibility mentioned above is used, a metal which can be formed by electroless plating, such as an alloy primarily composed of nickel, may be used as the reflector.

In the first invention, when a metal, which is used as a reflector, may be damaged by exposure thereof to chemical reagents and gases used in a step of forming a coloring layer, it is preferable that a second film, which covers at least the surface of the reflector, be further provided. In the arrangement mentioned above, it is preferable that the second film will not significantly decrease the reflectance of the reflector. In the first invention, since the coloring layer actually protects the reflector, it is sufficient for the second film described above to have resistance against chemical reagents, gases, and the like used in a step of forming the coloring layer. For example, when the coloring layer is formed on the reflector by a printing method or a dyeing method, a second film is not particularly required, and when the coloring layer is formed by a color resist method using a photosensitive color resist, since a strong alkaline developer may be used depending on materials to be used, the second film is preferably formed in accordance with a combination of a developer and a metal used for the reflector so as to cover the surface of the reflector.

However, when an aluminum alloy or a silver alloy is used as the reflector, the second film may be eliminated in some cases. For example, when an aluminum alloy containing 1 wt % neodymium is used for the reflector, since the corrosion resistance is improved, damage done to the reflector so as to decrease the reflectance will not occur by a developer having a general composition, such as a mixed aqueous solution of sodium carbonate and sodium hydrogencarbonate, or an aqueous solution of tetramethylammonium hydroxide, whereby the second film is not necessary to be provided.

In addition, for example, an aluminum alloy containing 3 wt % neodymium, or an aluminum alloy containing 3 wt % neodymium and 3 wt % titanium (Ti) is used for the reflector, corrosion resistance thereof is further improved, whereby the second film is not necessary to be provided.

Since the second transparent electrode must be formed on a surface having different properties, for example, glass or a resin material, the adhesiveness to these surfaces must be required to some extent. Accordingly, in the first embodiment, the second transparent electrode is preferably formed on a third film to improve the adhesiveness. As the third film, inorganic oxide films such as $SiO_2$ are mentioned, and in particular, it is preferable that $SiO_2$ and ITO to be used as the second transparent electrode be sequentially formed by sputtering or the like.

In the structure of the first invention in which the reflector is provided with the first openings, it is preferable that a fourth film formed so as to cover the coloring layer and a second opening in the coloring layer at the opening area in the shading film be further provided. According to the structure described above, color reproducibility both in reflective display and transmissive display can be optimized.

Alternatively, in the first invention, it is preferable that a fourth film formed so as to simply cover the coloring layer be further provided. By the fourth film mentioned above, since steps are planarized which are formed by the existence of the opening areas in the shading film and the coloring layer, and in addition, which are formed when there is the first openings in the reflector, degradation of display quality can be avoided.

The fourth film is preferably formed so as to have light scattering properties. According to the fourth film mentioned above, since the fourth film itself functions as a scattering layer, an additional scattering layer is not necessary to provide, and as a result, manufacturing steps can be reduced, and cost reduction can be performed.

As the fourth film described above, a resin material containing particles may be mentioned, in which the particles has refractive index different from that of the resin material and has diameters smaller than the thickness of the fourth film. Accordingly, a reflector having both flatness and scattering properties can be obtained.

As the resin material for the fourth film, acrylic resins or polyimide resins are mentioned, and as particles, inorganic particles, such as glass beads, and organic particles, such as polystyrene spherules, are mentioned. By the thickness of the resin material, difference in refractive indexes, particle diameters, and the degree of particle dispersibility, scattering properties can be controlled.

In the case described above, the haze value in the range of 40 to 90% and the difference in refractive indexes in the range of 0.05 to 0.12 are preferable. The refractive indexes of the resin material which can be used are, for example, approximately 1.50 for PMMA (polymethyl methacrylate), and approximately 1.60 to 1.65 for a polyimide resin, and the refractive indexes of particles which can be used are, for example, approximately 1.35 for PTFE (polytetrafluoroethylene), approximately 1.42 for PVDF (polyvinylidene fluoride), approximately 1.57 for LF1 optical glass, approximately 1.59 for styrene, approximately 1.62 for F2 optical glass, and approximately 1.65 for SF2 optical glass. By optional combination of materials described above, desired scattering properties can be obtained. The refractive indexes of the materials described above may have different values in accordance with manufacturing processes therefor and forms thereof. In addition, the materials described above are some of the materials that are usable, the first invention is naturally not limited thereto, and materials having various properties can be used by combination thereof.

In the first invention, the reflector is preferably formed on a roughened surface. According to the reflector mentioned above, since scattering properties are provided to the second substrate side, an additional scattering layer is not necessary to provide, whereby manufacturing steps can be reduced, and cost reduction can be performed. In addition, since the roughened surface is planarized by the fourth film, degradation of display quality caused by steps formed by the roughened surface can be avoided. For example, in order to provide scattering properties to the reflector, when roughened surface is formed which has a plurality of peaks and bottoms in which the difference thereof is 0.3 to 1.5 μm, since the thickness of the liquid crystal layer or the pretilt angle of liquid crystal molecules partly varies depending on the shape of the roughened surface, superior display quality may not be obtained in some cases. However, as described above, since a planarized surface can be obtained by the fourth film, flatness of the second transparent electrode can be maintained. Accordingly, the arrangement thus described is effective for a TN (twisted nematic) mode having a twist angle of 100° or less, and in particular, the arrangement is effectively combined with an STN mode which requires high precision in the thickness of the liquid crystal layer.

The roughened surface described above may be formed on a surface of a resin material formed on the surface of the second substrate at the liquid crystal layer side. As the resin material mentioned above, a photosensitive resin, such as an acrylic resin or a polyimide resin, can be effectively used. These materials have high temperature stability and can withstand processes for forming the reflector, the coloring layer, the second transparent electrode, and the like. Concerning photosensitivity, a negative and a positive type can both be used. In addition, a press method can be used in which a mold having a plurality of peaks and bottoms thereon is closely contacted on the surface of a coated resin material and is then pressed, and the roughened form is thereby transferred.

Furthermore, the roughened surface may be formed by performing a roughening treatment on the surface of the second substrate at the liquid crystal layer side. As the roughening treatment, there may be mentioned, for example, a method for coating and baking a sol-gel solution having particles dispersed therein, and a method for unevenly etching the surface of the substrate. In particular, when the second substrate is a glass substrate, there are several mentioned which may be used. For examples, there may be mentioned a first method for, after forming an oxide film on the surface of the substrate, unevenly etching the oxide film using the heterogeneous composition thereof, a second method of uneven etching using an etchant so as to dissolve parts of the substrate at which aluminum, boron, sodium, and the like exist at high concentrations contained therein, and a third method of uneven etching by an LPD (liquid phase deposition) method in which substrate components are precipitated by immersing the substrate in a supersaturated aqueous hydrofluoric acid solution. Among the methods described above, since the second and the third methods do not require steps of coating and sputtering and can only be performed by immersion in chemical solutions, they are advantageous in reducing cost.

In electronic apparatuses provided with the liquid crystal display devices of the first invention, bright and high quality reflective display can be performed, and in addition, since transmissive display can be performed when necessary, superior visibility can be obtained in various environments.

The objects described above can be achieved by the second substrate side in the liquid crystal display device of the first invention. That is, a substrate for a liquid crystal display device according to a second invention is a substrate opposite to the observer side of a pair of substrates for a liquid crystal display device, in which the pair of substrates have a liquid crystal layer provided therebetween. The substrate described above comprises a reflector formed on the substrate at the liquid crystal layer side so as to reflect at least light incident from the observer side, a shading film formed above the substrate at the liquid crystal layer side so as to have opening areas above the reflector, a coloring layer formed above the substrate at the liquid crystal layer side so as to cover the shading film, and a transparent electrode formed above the coloring layer.

According to this second invention, since the liquid crystal layer is provided between the same type transparent electrodes by adhering the substrate at the observer side and the second substrate, display quality and long-term reliability of the liquid crystal display device are not degraded. In addition, since the shading film and the coloring layer are formed on the reflector, damage done to the reflector can be avoided. Furthermore, since the coloring layer is formed so as to cover the shading film, surface reflection at the shading film is suppressed, and in addition, the optical density required for the shading film can be decreased.

In the second invention, the reflector is preferably provided with first openings so as to allow light to pass therethrough in the opening areas in the shading film. According to the reflector described above, since the reflector does not function as an electrode, that is, since the liquid crystal layer is driven by the transparent electrode even at the first openings in the reflector, transmissive display can be performed by light passing the first openings. In addition, in transmissive display, since light is not determined by the opening areas in the shading film but is determined by the first openings in the reflector, the optical density required for the shading film may be determined only by taking reflective display into consideration.

In the second invention, it is preferable that a first film is further provided between the reflector and the surface of the second substrate at the liquid crystal layer side. According to the first film mentioned above, even if adhesiveness between a metal used for the reflector and the second substrate is inferior, the adhesiveness of the reflector can be improved by the first film.

In the second invention, the shading film is preferably composed of a black resin material, and the optical density thereof is preferably 0.5 to 1.7. According to the shading film mentioned above, even if the shading film is formed of a black resin material, flatness of the substrate is not degraded, and the opening area ratio is not decreased.

In addition, in the second invention, the shading film is also preferably formed by laminating the coloring layers of at least two colors, and the optical density of the shading film is preferably 0.5 to 1.7. According to the shading film mentioned above, an additional film is not necessary to be provided as the shading film, and as a result, cost reduction can be performed.

In the second invention, a second film is preferably provided so as to cover at least the surface of the reflector. According to the second film mentioned above, since a metal used for the reflector is not exposed to chemical reagents, gases, and the like in a step of forming the coloring layer, damage will not be done to the reflector.

In the second invention, the transparent electrode is preferably formed on a third film that improves adhesive properties. According to the third film mentioned above, the transparent electrode can maintain the adhesiveness thereof to a surface of glass, a resin material, or the like having different properties and can be formed thereon.

In the second invention, when the first openings are provided in the reflector, a fourth film is preferably formed so as to cover the coloring layer and a second opening is preferably provided in the coloring layer at the opening area in the shading film. Accordingly, color reproducibility in reflective display and in transmissive display can be optimized.

Alternatively, in the second invention, a fourth film is preferably formed so as to simply cover the coloring layer. According to the fourth film mentioned above, since steps are planarized, which are formed by the existence of the opening areas in the shading film and the coloring layer, and which are formed when there are the first openings in the reflector, degradation of display quality can be avoided.

The fourth film preferably has light scattering properties. According to the fourth film mentioned above, since the fourth film itself functions as the scattering layer, an additional scattering film is not necessary to be provided, and as a result, cost reduction can be performed by decreasing the number of manufacturing steps.

As the fourth film, a film may be mentioned which is composed of a resin material containing particles having a refractive index differing from that of the resin material and having diameters smaller than the thickness of the fourth film. Accordingly, a reflector having flatness and scattering properties can be obtained.

In addition, in the second invention, the reflector is preferably formed on a roughened surface formed on the substrate at the liquid crystal layer side. According to the reflector formed on the roughened surface, since the substrate itself also has scattering properties, an additional scattering film is not necessary to be provided, and as a result, cost reduction can be performed by decreasing the number of manufacturing steps. In addition, a roughened surface is planarized by the fourth film, degradation of display quality caused by steps formed by the roughened surface can be avoided.

As the roughened surface described above, there are mentioned a surface of a resin material formed on the surface of the substrate at the liquid crystal layer side, a surface obtained by a roughening treatment of the surface of the substrate at the liquid crystal layer side, and the like.

BEST MODE FOR CARRYING OUT THE INVENTION

Hereinafter, embodiments of the present invention will be described with reference to drawings.

EMBODIMENT 1

A reflective liquid crystal display device according to Embodiment 1 of the present invention will first be described. For the convenience of description of the present invention, a schematic structure of the liquid crystal display device will first be described with reference to FIG. 1; secondly, embodiments applicable to a substrate disposed at the back of the liquid crystal display device (substrate at the side opposite to the observer side), which is one of a pair of substrates thereof, will be described with reference with FIGS. 2 to 6; thirdly, positional relationship of a shading film in each embodiment will be described with reference to FIGS. 7 to 9; and fourthly, application examples and modified examples will be described.

Figure 1:
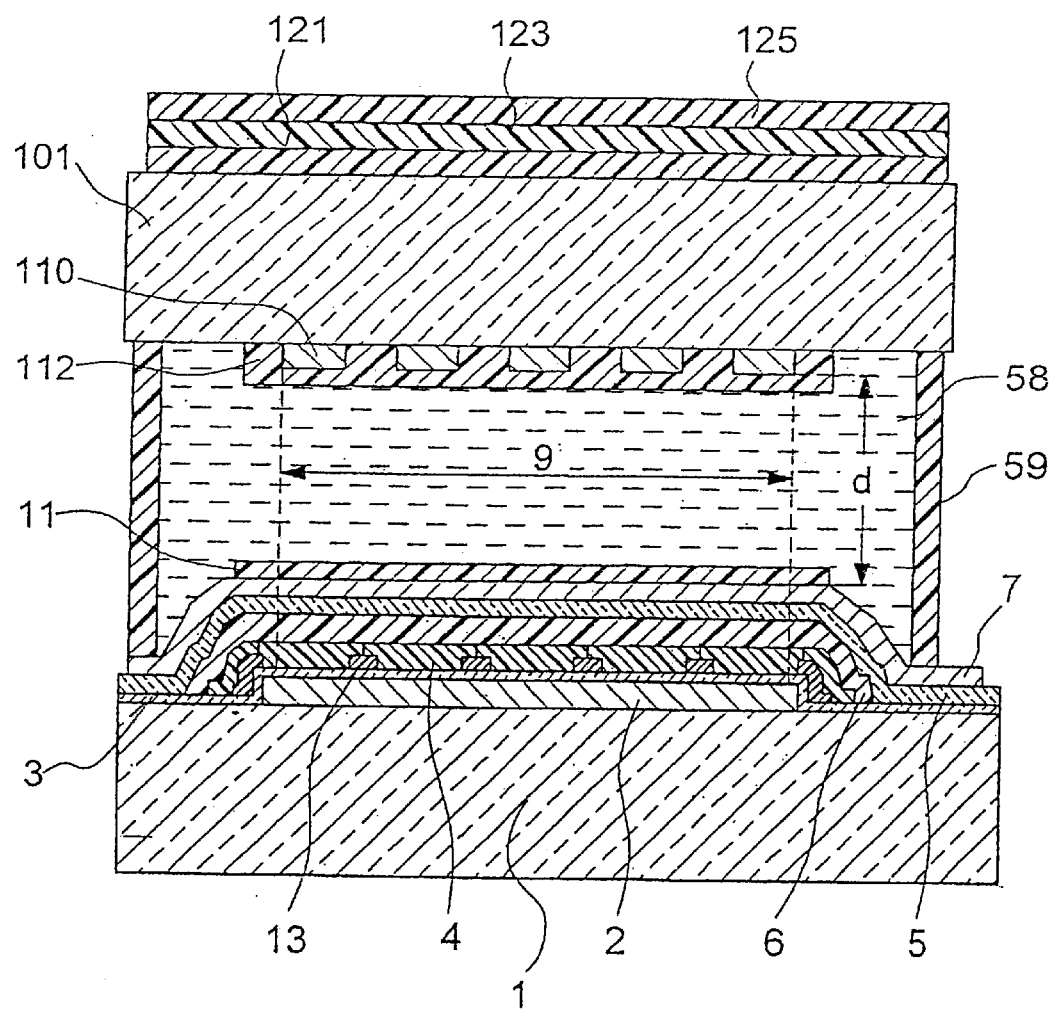
FIG. 1 is a schematic cross-sectional view showing a structure of a reflective liquid crystal display device according to a first embodiment of the present invention.

First, the schematic structure of the liquid crystal display device will be described. FIG. 1 is a schematic cross-sectional view of the liquid crystal display device. As shown in the figure, in the liquid crystal display device, between an upper substrate 101 (a first substrate) and a lower substrate (a second substrate) 1, each has transparent and insulating properties, a liquid crystal layer 58 is enclosed by a sealing material 59 in the form of frame, which is nematic liquid crystal having a predetermined twist angle, thereby forming a liquid crystal cell. On an inside surface of the upper substrate 101, a plurality of electrodes (first transparent electrode) 110 in the form of stripes composed of a transparent electro-conductive layer such as of ITO is formed perpendicular in the figure, and an alignment film 112 is formed on the surface thereof and is processed by a rubbing treatment in a predetermined direction. Meanwhile, on the outside surface of the substrate 101, a front scattering film 121, a retardation film 123, and a polarizer 125 are sequentially disposed, in that order, from the substrate 101 side.

In addition, on the inside surface of the lower substrate 1, a reflector 2, a protective film 3, a shading film 13, a coloring layer 4, a protective film 6, an adhesion-improving layer 5, and an electrode 7 are sequentially formed. The details of the structure mentioned above will be described later. The electrode (second electrode) 7 is composed of the same material as is used for the electrode 110 formed on the upper substrate 101, i.e., an electro-conductive layer composed of, for example, ITO, and a plurality of the electrodes 7 in the form of stripes are formed in the horizontal direction in the figure so as to be orthogonal to the plurality of electrodes 110. Accordingly, in this liquid crystal display device, an area at which the electrodes 7 and 110 intersect each other is a pixel in a design. An area 9 indicates a region at which pixels in the design are aligned, i.e., a display area.

In addition, the reflector 2 is composed of a metal layer having reflective properties, such as aluminum or silver, and reflects light incident from the upper substrate 101. Next, the protective film (second film) 3 is formed in accordance with properties of the reflector 2, as described later. The shading film 13 is composed of a material having shading properties, such as a black resin material or chromium, and is provided with openings at areas corresponding to the intersection areas of the electrodes 7 and 110. In addition, the coloring layer 4 is composed of, for example, three colors R (red), G (green), and B (blue) disposed in a predetermined pattern in the opening areas provided in the shading film 13. The protective film (fourth film) 6 serves to planarize steps formed by, for example, the coloring layer 4 and the shading film 13 and to protect the reflector 2 together with the coloring layer 4. The adhesion-improving layer (third film) 5 is composed of an inorganic oxide film such as $SiO_2$ and is formed over the entire surface above the substrate including the surface of the protective film 6 so as to improve the adhesiveness to the electrode 7. Above the adhesion-improving layer 5 and on the surface of the electrode 7, an alignment film 11 is formed and is processed by a rubbing treatment in a predetermined direction.

In the structure described above, ambient light reaches the reflector 2 via the polarizer 125, the retardation film 123, the front scattering film 121, the substrate 101, the electrode 110, the liquid crystal layer 58, the electrode 7, and the coloring layer 4, and the light is then reflected at the reflector 2, retraces its path through which it passed, and is emitted from the polarizer 125 to the observer side. In this step, an amount of the light emitted from the polarizer 125 is controlled to be in a bright state, a dark state, or an intermediate state therebetween in accordance with a voltage applied to the liquid crystal layer 58 by the electrodes 7 and 110. Accordingly, by controlling a voltage applied to the liquid crystal layer 58, a desired display can be performed.

Consequently, according to this liquid crystal display device, since the liquid crystal layer 58 is provided between the electrodes 7 and 110, which are composed of the same ITO, the display quality and the long-term reliability are not degraded. In addition, the shading film 13 and the coloring layer 4 are formed on the reflector 2, so that the reflector is not exposed. Accordingly, in a manufacturing process of the liquid crystal display device, the reflector 2 is not exposed to chemical reagents, gases, liquid crystal, and the like, and therefore damage to the reflector 2 can be suppressed. Furthermore, since the coloring layer 4 is formed so as to cover the shading film 13, the surface reflection at the shading film 13 is not only suppressed, but also, the optical density required for the shading film 13 can be less. In particular, since light passes through the shading film twice in reflective display, the practical optical density of the shading film 13 can be less.

This liquid crystal display device described above is a passive matrix device; however, the present invention is not limited thereto, and it can also be applied to an active matrix liquid crystal display device using three-terminal switching elements represented by TFT elements, two-terminal switching elements represented by TFD elements, or the like. When the liquid crystal display device is an active matrix liquid crystal display device, the electrode 110 is formed to, for example, rectangular pixel electrodes, and is connected to wiring via switching devices. In the liquid crystal display device provided with TFD elements, the electrode 7 must be patterned in the form of stripes so as to oppose pixel electrodes; however, in the liquid crystal display device provided with TFT elements, the electrode 7 need not be patterned.

In addition, in this embodiment, the interior structure of the lower substrate 1 is not limited to that shown in FIG. 1, and various embodiments can be applied thereto. Consequently, these embodiments in detail will be described in which the alignment film 11 is omitted.

Figure 2:
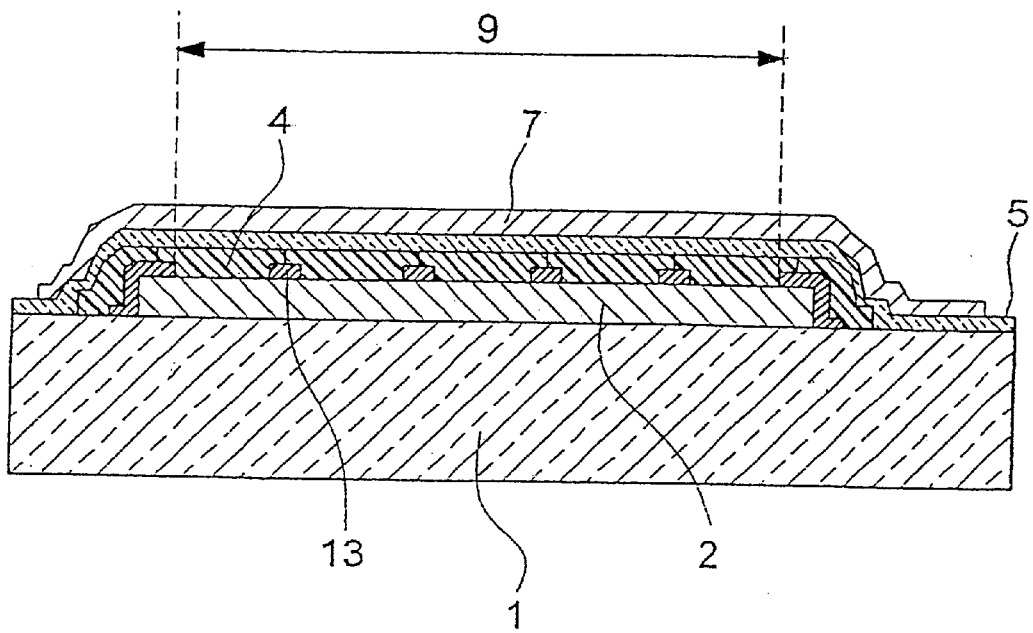
FIG. 2 is a schematic cross-sectional view showing an example of a substrate disposed at the back in the embodiment.

FIG. 2 is a schematic cross-sectional view showing one of the embodiments mentioned above. On the inside surface of the substrate 1 composed of glass or the like having insulating properties and transparency, i.e., the surface thereof opposing the upper substrate 101, the reflector 2 primarily composed of aluminum is formed. The reflector 2 is patterned by a lithographic method so as to include the display area 9.

Next, on the patterned reflector 2, the shading film 13 is formed which is composed of a black resin material having a thickness of approximately 0.6 $\mu$m. In addition, the coloring layer 4 composed of resist materials is formed so that three colors, for example, R (red), G (green), and B (blue), are aligned in a predetermined pattern and so as to cover the entire reflector 2 including the shading film 13. Accordingly, the coloring layer 4 actually serves as a protective film for the reflector 2.

In the case described above, the optical density of the shading film 4 itself is 1.4. The optical density mentioned above is the value represented by the logarithm of the reciprocal of the transmittance of the shading film 13, which is a material to be measured. That is, when the intensity of light incident on the shading film 13 is represented by $I_0$, and when the intensity of light transmitted through the shading film 13 is represented by I, the optical density thereof is represented by the formula shown below.

$$D=\log_{10}(I_0/I)$$

Subsequently, the adhesion-improving layer 5 and an ITO film, which is a transparent metal, are sequentially formed. The ITO film mentioned above is patterned so as to form the electrode 7 in accordance with a liquid crystal display device to be used. The adhesion-improving layer 5 is formed of an inorganic oxide film composed of $SiO_2$ approximately 20 to 80 nm thick or the like so as to ensure the cohesion between the electrode 7 and the coloring layer 4 composed of a resin material. Accordingly, when the ITO has sufficient adhesiveness, the adhesion-improving layer 5 can be omitted.

In the structure described above, since a black resin material is used for the shading film 13, when the black resin material is used for the substrate at the back, which is one of the pair of substrates forming the liquid crystal display device, the surface reflectance thereof is decreased, and hence, decrease in the contrast ratio in a bright place can be avoided. The optical density of the shading film 13 itself is 1.4; however, since the coloring layer 4 is provided so as to cover the shading film 13, and light passes through the shading film 13 twice in a reflective display, the practical optical density of the shading film 13 is 2.8 or more, which is sufficient in reflective display.

Figure 3:
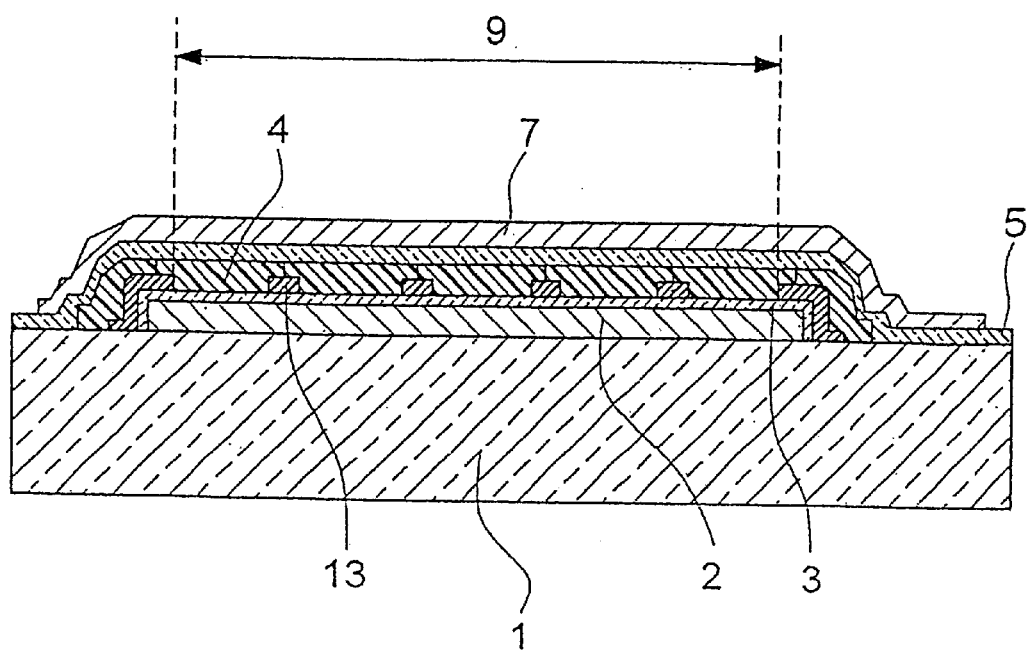
FIG. 3 is a schematic cross-sectional view showing another example of the substrate.

When a metal material primarily composed of aluminum is used for the reflector 2, as shown in FIG. 3, a structure may be employed in which the surface of the reflector 2 is covered with the protective film 3. The protective film 3 is formed by anodizing the patterned reflector 2. An electrolyte used for this anodization is a solution containing 1 to 10 wt % salicylic ammonia and 20 to 80 wt % ethylene glycol, and the conditions may be optionally determined in accordance with a desired film thickness within the ranges of an electrolytic voltage of 5 to 250 V and a current density of 0.001 to 1 mA/cm$^2$. The electrolyte for anodization is not limited to the solution described above, and in addition, conditions of electrolytic voltage and current density may be optionally determined in accordance with the electrolyte to be used.

Meanwhile, as the reflector 2, in addition to aluminum, a metal, such as chromium, nickel, silver, or the like, or an alloy primarily composed of the metals mentioned above may be used. Among those mentioned above, when silver or an alloy primarily composed thereof is used as the reflector 2, the reflectance can be increased; however, since anodization is difficult to perform, for forming the protective film 3, for example, chemical vapor deposition, spin coating, or roll coating are employed. When the protective film 3 is formed by chemical vapor deposition, $SiO_2$ or $Si_3N_4$ can be used, and when spin coating or roll coating is employed, an organic insulating film is used.

Figure 4:
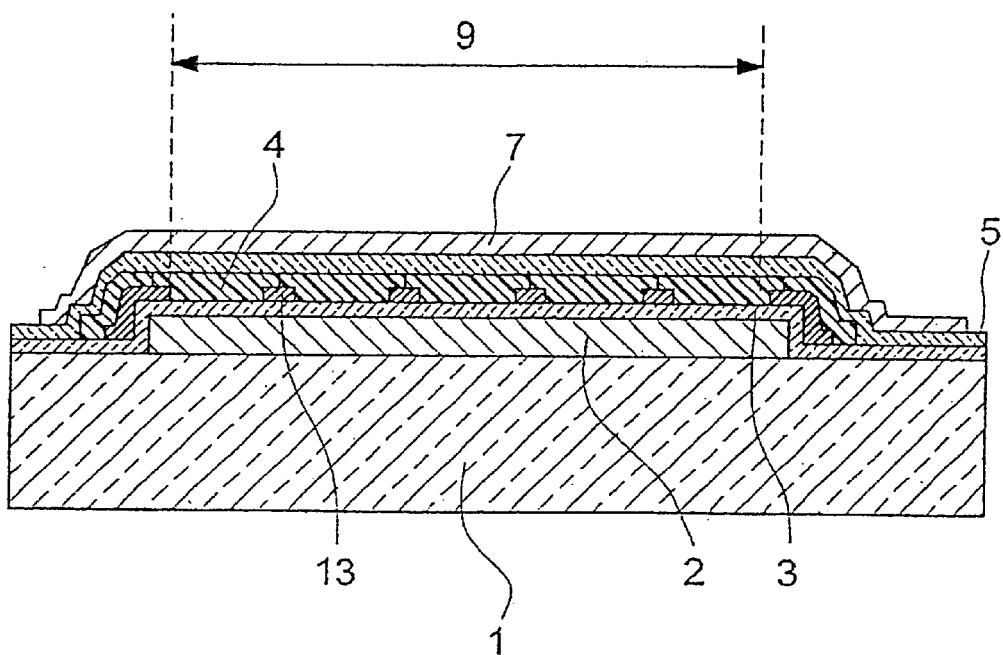
FIG. 4 is a schematic cross-sectional view showing another example of the substrate.

As described above, when the protective film 3 is formed by a method other than anodization, as shown in FIG. 4, the protective film 3 is formed not only on the exposed surface of the reflector 2 but also on the entire surface of the substrate 1. In the case in which the reflector 2 is formed of a metal material primarily composed of aluminum, the structure shown in FIG. 3 is naturally formed in which an organic insulating film formed by spin coating, roll coating, or the like is used in addition to $SiO_2$ or $Si_3N_4$ formed by chemical vapor deposition.

Figure 5:
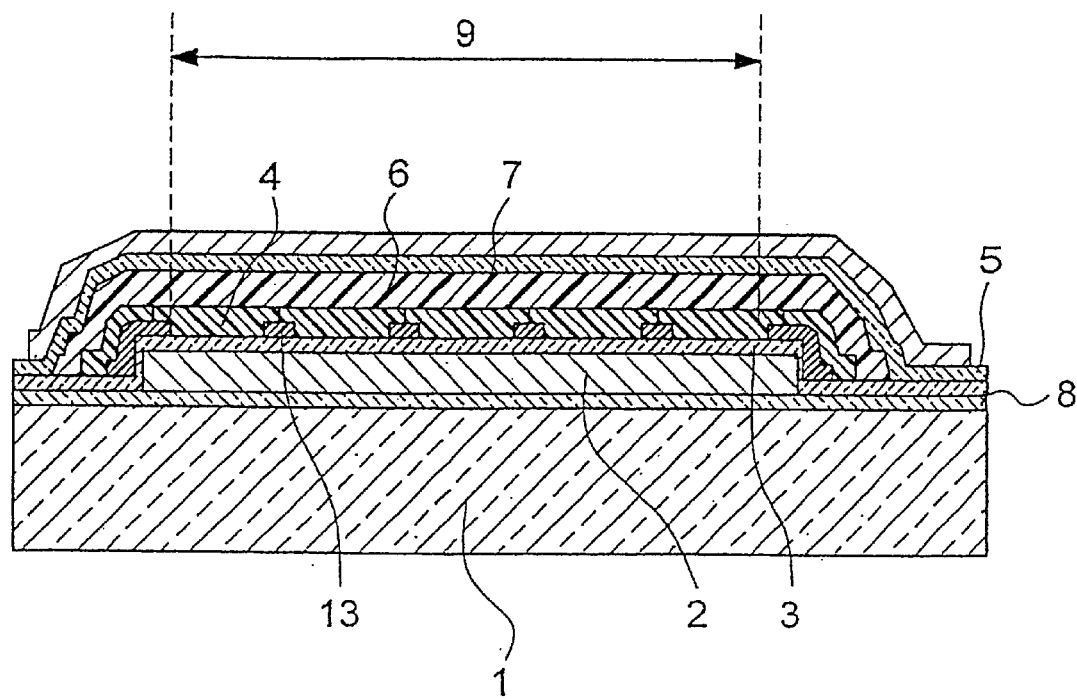
FIG. 5 is a schematic cross-sectional view showing another example of the substrate.

Furthermore, when an STN mode or an IPS (in plain switching) mode is used for a liquid crystal display device, since a surface at which the electrode 7 is formed is required to be flat, and in this case, as shown in FIG. 5, it is preferable that the protective film 6 be additionally formed between the coloring layer 4 and the adhesion-improving layer 5 shown in FIG. 4. The structure mentioned above will be described below. On the patterned reflector 2, the protective film 3 composed of $SiO_2$ of 60 nm thick is formed by chemical vapor deposition, and the shading film 13 composed of a black resin material is then formed. The thickness of the shading film 13 is approximately 0.4 $\mu$m and is thinner compared to those shown in FIGS. 2 to 4. Subsequently, on the coloring layer 4 formed so as to cover the entire surface of the reflector 2 including the shading film 13, the protective film 6 composed of a photosensitive acrylic resin or the like is formed in a specified area so as to cover the entire coloring layer 4.

In the structure described above, the shading film 13 is thin and has a thickness of, for example, approximately 0.4 $\mu$m, and hence, the optical density of the shading film 13 is also decreased to be 0.9. However, since the coloring layer 4 and the protective film 6 are formed so as to cover the shading film 13, and since light passes through the shading film 13 twice, the practical optical density of the shading film 13 is 1.8 or more, which is sufficient for reflective display. In addition, by decreasing the thickness of the shading film 13, the flatness of the surface at which the electrode 7 is to be formed can be controlled within 0.1 $\mu$m in the display area 9.

In the embodiment described above, the reflector 2 is directly formed on the upper surface of the substrate 1; however, when the adhesiveness of the reflector 2 is not sufficient, a structure may be employed in which, between the reflector 2 and the upper surface of the substrate 1, an adhesion-improving layer (first film) 8 for improving the adhesiveness of the reflector 2 may be additionally formed, as shown in FIG. 5. As the adhesion-improving layer 8, metals, oxides, and nitrides can be used. As the metals, transition metals included in Groups Vb to VIb, such as Ta, Cr, Mo, and W, are mentioned. As examples of the oxides, oxides of the transition metals mentioned above, such as $Ta_2O_5$, and silicon oxides such as $SiO_2$ are mentioned, and as other examples of the oxides, $TiO_2$, $ZrO_2$, $SiO_2$ optionally combined with the oxides mentioned above, $Al_2O_3$, or the like are mentioned. In addition, as examples of nitrides, silicon nitrides represented by $Si_3N_4$ are mentioned. Since the adhesion-improving film 8 is used for improving adhesiveness of the reflector 2, a thickness of approximately 100 nm or 30 to 60 nm, depending on the case, is sufficient. In addition, when a film having no conductance, such as a $SiO_2$ film or a $Ta_2O_5$ film, is used, since the adhesion-improving film 13 may remain over the entire surface of the insulating substrate 1, it is not necessary to pattern the adhesion-improving film 8. For example, when a metal layer primarily composed of silver or an alloy primarily composed of silver is used as the reflector 2, and when glass is used as the insulating substrate 1, a film composed of Mo, $Ta_2O_5$, $SiO_2$, or the like, is preferably used as the adhesion-improving film 8. When a substrate having flexibility, such as a plastic film, is used as the insulating layer 1, a $SiO_2$ film, a film composed of $TiO_2$, $ZrO_2$, $SiO_2$ optionally combined these oxides mentioned above, or the like is preferably used. In this connection, a film such as the adhesion-improving film 8 is not only used for the substrate shown in FIG. 5 but may be naturally formed on the substrate shown in FIG. 2, FIG. 3, or FIG. 4.

In reflective display, the structure is preferably used in which light is appropriately scattered and is emitted from the polarizer 125 provided at the upper substrate 101 side. Accordingly, in the structure shown in FIG. 1, the front scattering film 121 is provided on the outside surface of the upper substrate 101; however, the scattering function mentioned above can be performed using the lower substrate 1, as will be described later in application examples, by forming the reflector 2 on a roughened surface of the substrate 1 or by forming the protective film 6 in accordance with the structure as shown in FIG. 6.

That is, the protective film 6 shown in the figure is composed of a resin material 6a, such as a photosensitive acrylic resin, containing particles 6b dispersed therein having a refractive index differing from that of the resin material 6a. The resin material 6a is preferably combined with the particles 6b dispersed therein so that the difference in refractive indexes therebetween is in the range of 0.05 to 0.12. For example, when a combination is employed in which PVDF (polyvinylidene fluoride) particles are dispersed in PMMA (polymethyl methacrylate) resin, a difference in refractive indexes of approximately 0.8 can be obtained. Naturally, the combination is not limited to that described above, and materials can be used by appropriate combination therebetween so as to obtain desired difference in refractive indexes and desired degree of scattering. Since the protective film 6 as described above has a function as light scattering due to Mie scattering, the front scattering film 121 in FIG. 1 can be omitted.

Figure 6:
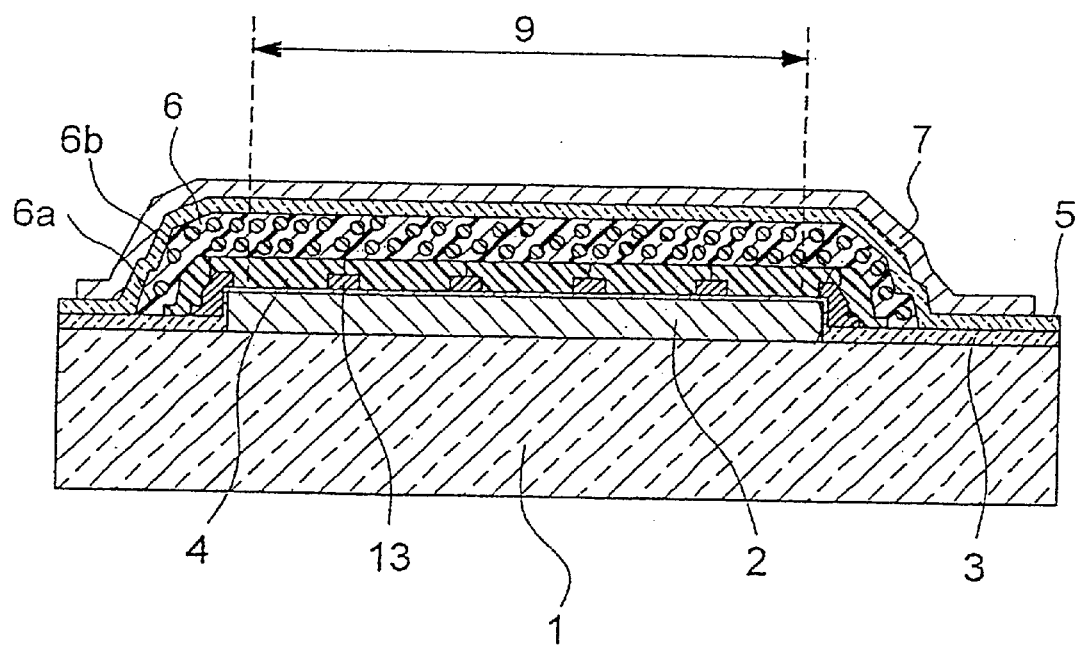
FIG. 6 is a schematic cross-sectional view showing another example of the substrate.

As the protective film 6 in FIG. 5 or 6, a resin material having photosensitivity can be used in addition to a photosensitive acrylic resin. When a printing method, a transfer method, or the like is employed in the case in which the protective film 6 is provided in a specified area, or when the protective film 6 may be provided over the entire surface of the substrate 1, a sol-gel film or an organic protective film having no photosensitivity can be used.

Figure 7A:
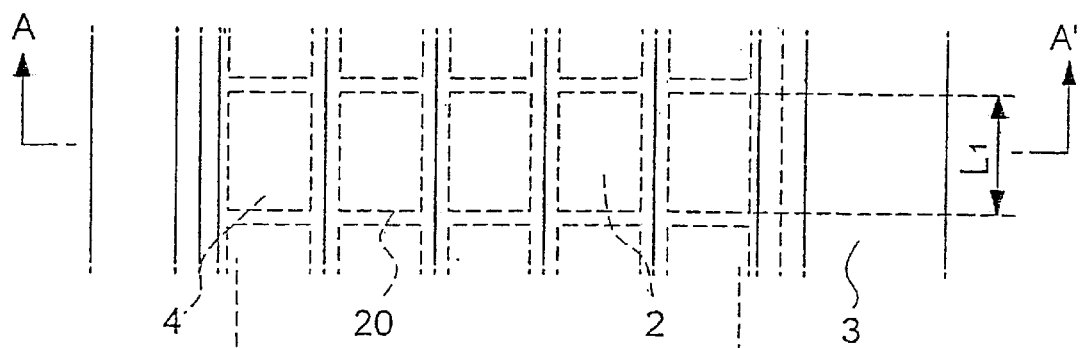
FIG. 7A is a plan view showing the positional relationship of an opening area in a shading film above the substrate disposed at the back in the above embodiment.
Figure 7B:
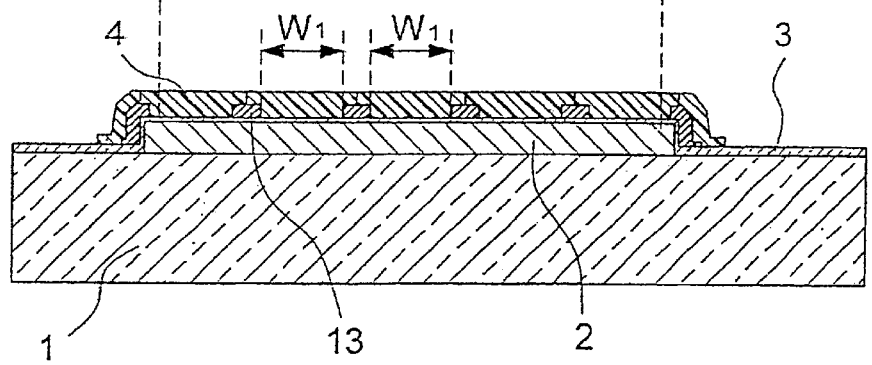
FIG. 7B is a schematic cross-sectional view taken along the line A–A' in FIG. 7A, in which a coloring layer is formed.
Figure 7C:
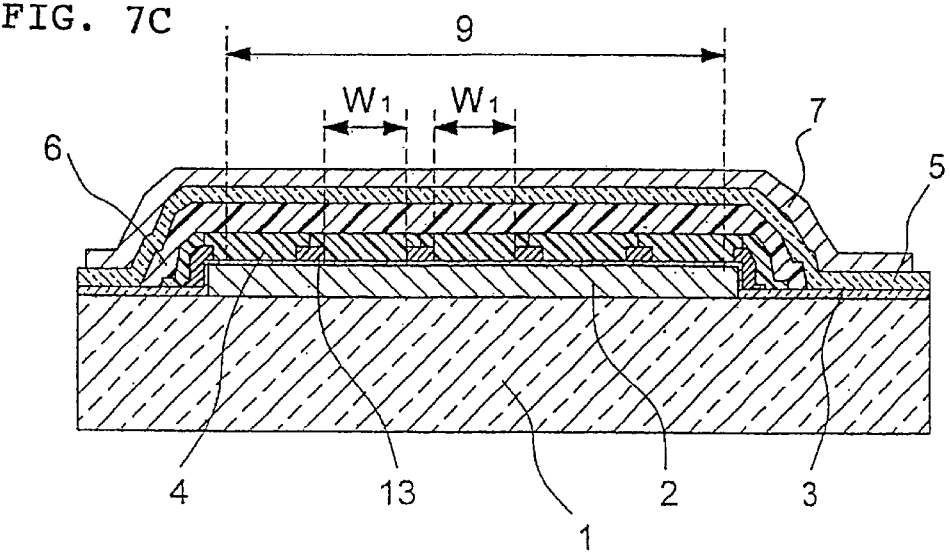
FIG. 7C is a schematic cross-sectional view taken along the line A–A' in FIG. 7A, in which an electrode is formed.

Next, the positional relationship of the shading film 13, and in particular, the positional relationship of the opening areas in the shading film 13 and the electrode 7 will be described. FIG. 7A is a schematic plan view showing the arrangement of the shading film 13 and the coloring layer 4, which are formed inside the lower substrate 1, FIG. 7B is a schematic cross-sectional view taken along the line A–A' in FIG. 7A, and both figures show the structure in which the coloring layer 4 is formed. FIG. 7C is a schematic cross-sectional view showing the structure in which the electrode 7 is formed above the substrate shown in FIG. 7B.

As shown in these figures, the opening areas in the shading film 13 are provided in individual areas 20 at which the liquid crystal layer can be effectively driven. In the substrate shown in FIG. 7A, FIG. 7B, and FIG. 7C, when the liquid crystal display device is formed, the area 20 is an area at which the electrode 7 provided above the lower substrate 1 and the electrode 110 provided on the upper substrate 101 intersect each other, and the area 20 coincides with the pixel in a design. That is, when the width of the electrode 7 is represented by $L_1$ and the width of the electrode 110 is represented by $W_1$, the area 20 in these figures is a rectangular area defined by the length $L_1$ and the width $W_1$.

Figure 19A:
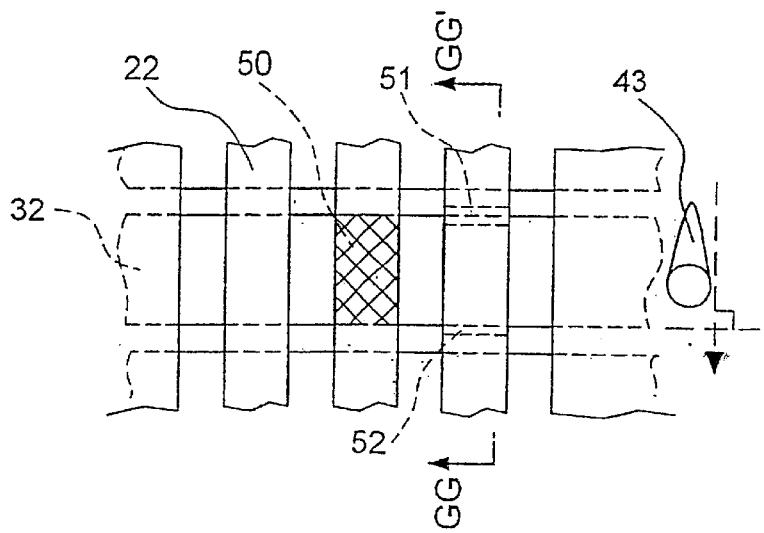
FIG. 19A is a schematic plan view showing a structure of a common passive matrix liquid crystal display device.
Figure 19B:
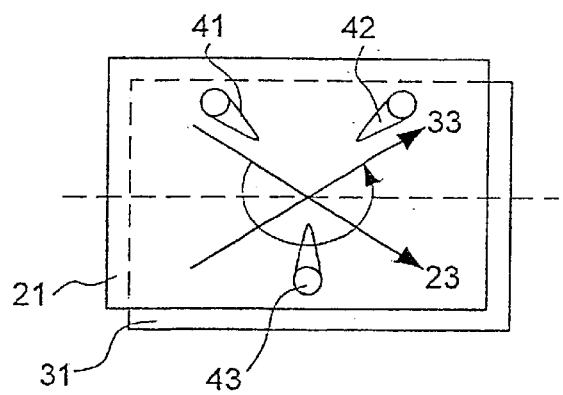
FIG. 19B is a plan view showing an aligned direction of liquid crystal molecules in the vicinity of a substrate of the above liquid crystal display device and an aligned direction of bulk liquid crystal molecules in a liquid crystal layer.
Figure 19C:
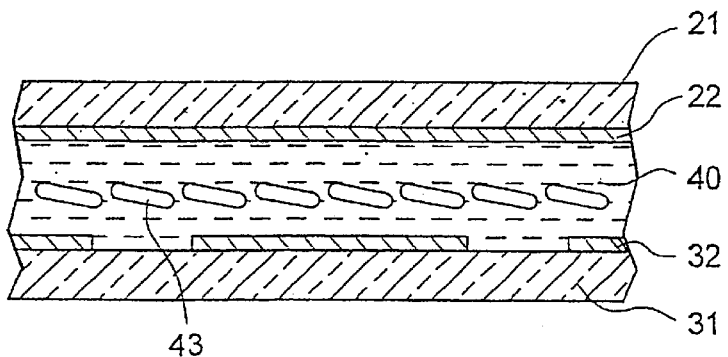
FIG. 19C is a schematic cross-sectional view taken along the line GG–GG' in FIG. 19A when a voltage is not applied.
Figure 19D:
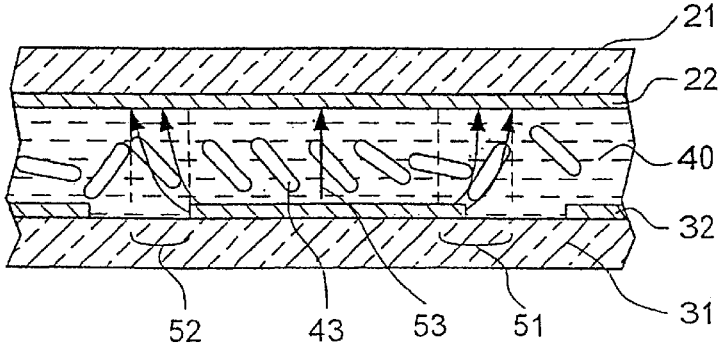
FIG. 19D is a schematic cross-sectional view taken along the line G–GG' in FIG. 19A when a voltage is applied.

As described with reference to FIG. 19D, in addition to the area (for the sake of convenience, hereinafter referred to as "region A") at which the liquid crystal even outside the intersection area is driven by an oblique electric field, an area (for the sake of convenience, hereinafter referred to as "region B") exists at which the liquid crystal is not normally driven even inside the intersection area. Consequently, from a strict point of view, in consideration of the areas described above, the opening areas in the shading film 13 must be provided. However, when the area 20 (the length $L_1$ and the width $W_1$) is sufficiently greater than the thickness d (see FIG. 1) of the liquid crystal layer, the regions A and B can be ignored. In the substrate shown in FIG. 7A, FIG. 7B, and FIG. 7C, assuming that the area 20 (the length $L_1$ and the width $W_1$) is sufficiently greater than the thickness d of the liquid crystal layer, the opening area in the shading film 13 is determined by ignoring the regions A and B.

Figure 8A:
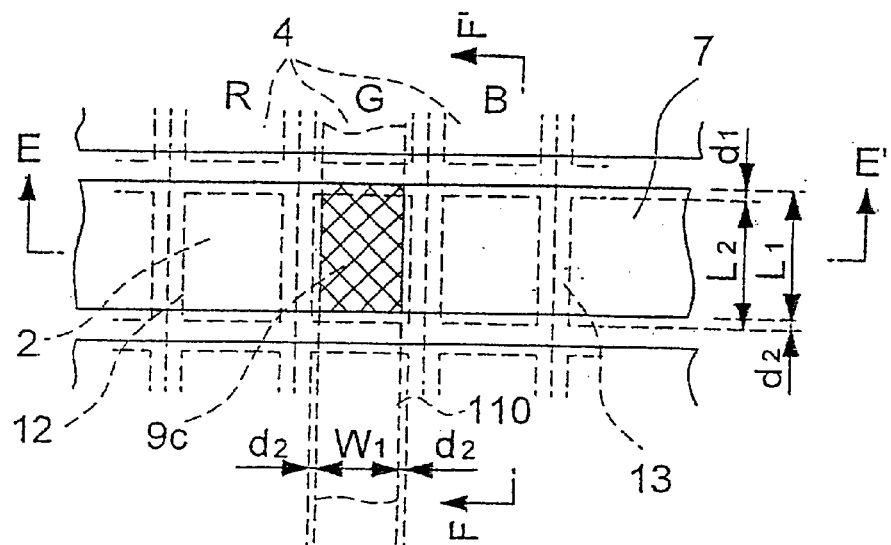
FIG. 8A is a partial plan view showing the positional relationship of the opening area in the shading film above the substrate disposed at the back in the embodiment.
Figure 8B:
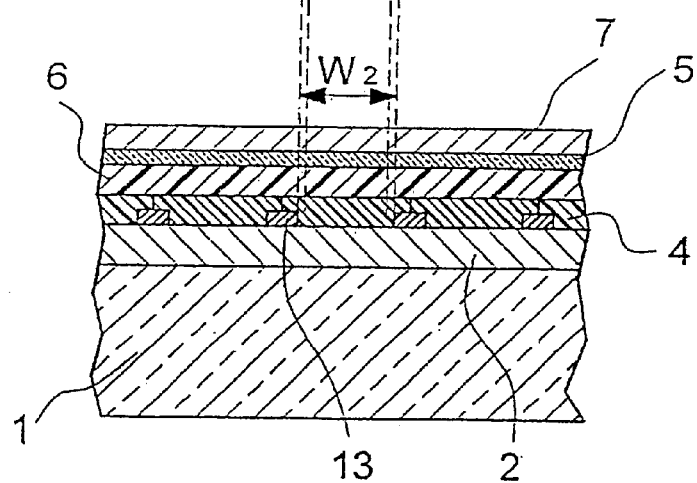
FIG. 8B is a schematic cross-sectional view taken along the line E–E' in FIG. 8A, in which the electrode is formed.
Figure 8C:
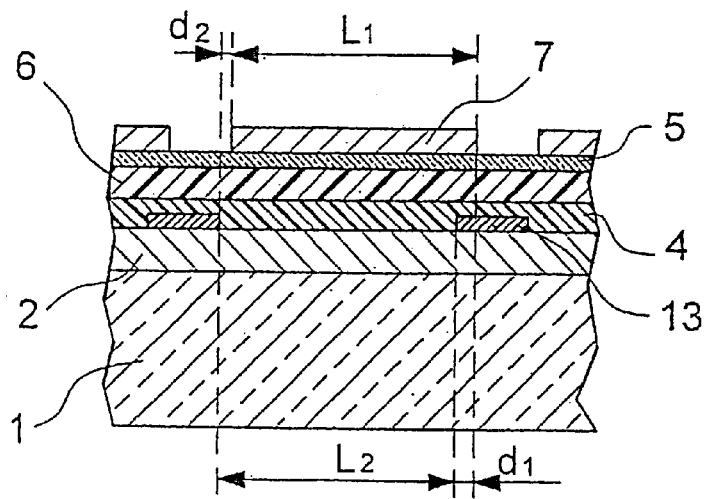
FIG. 8C is a schematic cross-sectional view taken along the line F–F' in FIG. 8A, in which the electrode is formed.
Figure 9A:
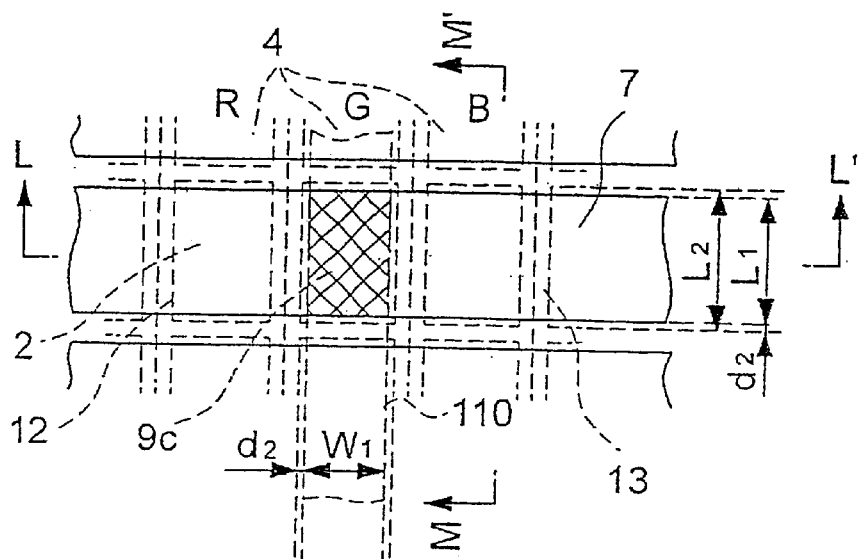
FIG. 9A is a partial plan view showing the positional relationship of the opening area in the shading film above the substrate disposed at the back in the embodiment.
Figure 9B:
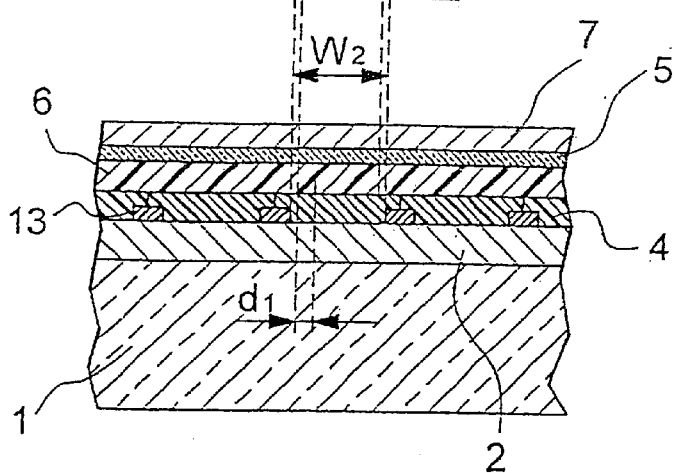
FIG. 9B is a schematic cross-sectional view taken along the line L–L' in FIG. 9A, in which the electrode is formed.
Figure 9C:
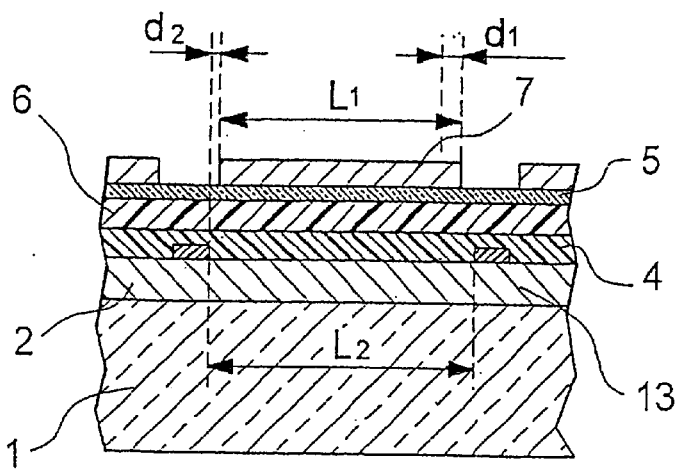
FIG. 9C is a schematic cross-sectional view taken along the line M–M' in FIG. 9A, in which the electrode is formed.

Accordingly, hereinafter, the case will be described in which the opening area in the shading film 13 is determined in consideration of the regions A and B. The opening area in the shading film 13 in consideration of the regions A and B is, when the two substrates 1 and 101 are adhered to each other, an area that the intersection area between the electrodes 7 and 110 added with the region A and deducted with the region B, i.e., a rectangular area 12 defined by a length $L_2$ and a width $W_2$ in FIG. 8A. FIG. 8A is a partial plan view showing the arrangement of the shading film 13 and the coloring layer 4, which are formed inside the lower substrate 1, FIG. 8B is a schematic cross-sectional view taken along the line E–E' in FIG. 8A, and FIG. 8C is a schematic cross-sectional view taken along the line F–F' in FIG. 8A. As shown in these figures, the opening area 12 in the shading film 13 in consideration of the regions A and B is that, with respect to an area 9c (a rectangular area defined by the length $L_1$ and the width $W_1$) of the pixel in a design, one of the sides thereof orthogonal to the director direction of the liquid crystal molecules is shorter by a length $d_1$, and the other sides thereof are longer by a length $d_2$. Accordingly, the area expanded by the length $d_2$ corresponds to the region A at which the liquid crystal molecules are driven by an oblique electric field, and the area contracted by the length $d_1$ corresponds to the region B at which the liquid crystal molecules are not driven by an oblique electric field. The lengths $d_1$ and $d_2$ will be described below in detail. In the case in which the two substrates 1 and 101 are adhered to each other in the liquid crystal display device as shown in FIG. 1, when the distance (that is, the thickness of the liquid crystal layer 58) between the electrodes 7 and 110 is represented by d, the length $d_1$ is approximately equivalent to or shorter than the distance d, and the length $d_2$ is approximately equivalent to or shorter than the half of the distance d.

In the structure described above, even in the region A, which is outside the intersection area 9c of the electrodes 7 and 110, since the reflector 2 reflects light due to the openings provided in the shading film 13, the practical opening area ratio can be increased. At the same time, even in the region B, which is inside the intersection area 9c, since the shading film 13 is provided, the decrease in contrast ratio thereof due to the liquid crystal molecules which are not driven can be suppressed.

In this connection, with respect to the intersection area 9c between the electrodes 7 and 110, a direction and an area of the region A which expands and a direction and an area of the region B which contracts vary in accordance with a liquid crystal display mode to be used and with various conditions, such as rubbing directions on the substrates 1 and 101. However, in any case, the opening area 12 in the shading film 13 is patterned so as to be, with respect to the area 9c, shorter by the length $d_1$ which is approximately equivalent to the distance d and is longer by the length $d_2$ which is equivalent to approximately the half of the d (see FIG. 9A, FIG. 9B, and FIG. 9C). That is, the length $L_2$ and the width $W_2$ of the opening area 12 in the shading film 13 are controlled to be in the ranges described below.

$$L_1 - 2 \cdot d_1 \leq L_2 \leq L_1 + 2 \cdot d_2$$

$$W_1 - 2 \cdot d_1 \leq W_2 \leq W_1 + 2 \cdot d_2$$

Application and Modification Examples of Embodiment 1

Figure 10A:
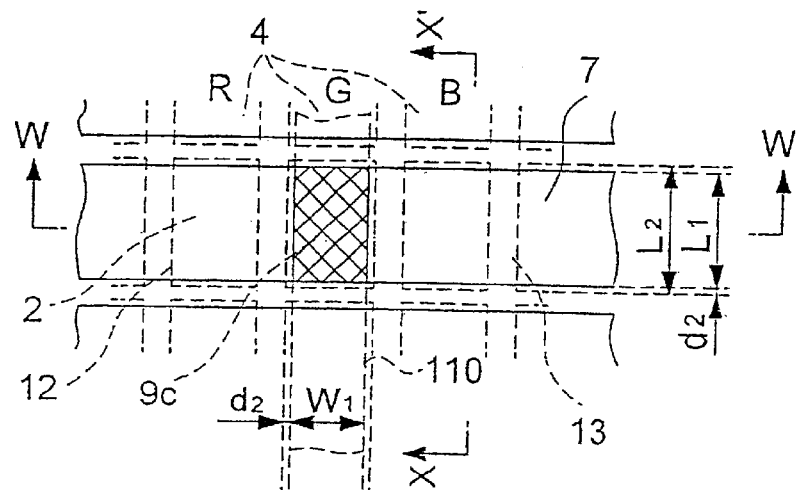
FIG. 10A is a partial plan view showing another structure of a substrate disposed at the back in the embodiment.
Figure 10B:
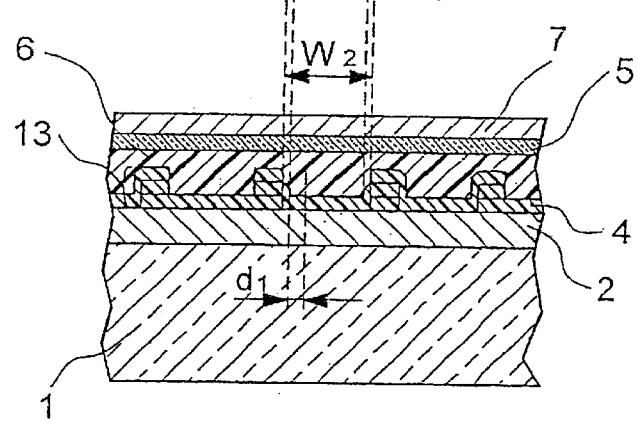
FIG. 10B is a schematic cross-sectional view taken along the line W–W' in FIG. 10A, in which an electrode is formed.
Figure 10C:
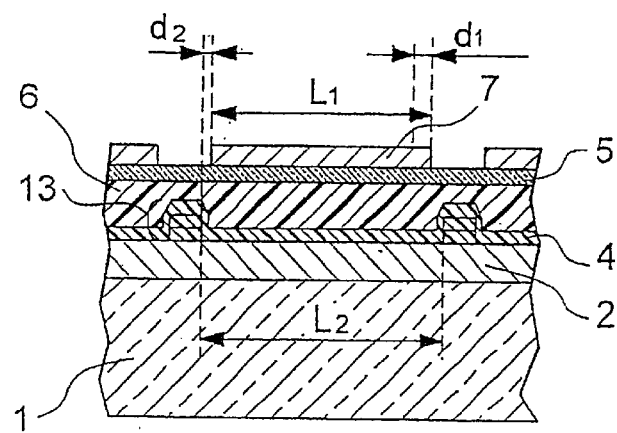
FIG. 10C is a schematic cross-sectional view taken along the line X–X' in FIG. 10A, in which the electrode is formed.

In the embodiment described above, the shading film 13 is formed of a black resin material; however, it may be formed by a method described below. That is, a layer is not additionally formed as the shading film 13, but an area at which the coloring layers 4, R (red), G (green), and B (blue), are laminated with each other is employed as the shading film 13. The structure mentioned above will be described with reference to FIG. 10A, FIG. 10B, and FIG. 10C. FIG. 10A is a partial plan view showing the structure mentioned above, FIG. 10B is a schematic cross-sectional view taken along the line W–W' in FIG. 10A, and FIG. 10C is a schematic cross-sectional view taken along the line X–X' in FIG. 10A.

As shown in these figures, photosensitive color resists R, G, and B are sequentially patterned on the patterned reflector 2 so as to laminate each other at which the shading film 13 is to be formed by a color resist method. Consequently, the area at which the three coloring layers 4 are formed by laminating each other is black by mixing colors and functions as the shading film 13. In addition, an area at which one coloring layer is formed functions as the opening area 12 in the shading film 13 as is the case with the embodiment described above. The protective film 6 is formed so as to cover the surface of the coloring layers, so that, in addition to the protection thereof, planarization is performed between the areas at which the coloring layers are laminated and the areas at which coloring layers are not laminated.

The optical density at which three different coloring layers 4 are laminated with each other is approximately 0.7; however, since the area mentioned above is formed of the coloring layer 4, the surface reflectance thereof is small. Accordingly, adverse effects, such as decrease in contrast ratio, will not occur. In addition, in reflective display, since light passes through the shading film 13 twice, which is formed by laminating the coloring layers 4 of three colors, the practical optical density thereof is 1.4 or more as the shading film 13, and hence, sufficient shading properties are obtained in reflective display. Furthermore, since the additional step of forming a film to be used as the shading film 13 is omitted, costs can be reduced.

In these figures, the same references designate components previously described, and descriptions thereof are omitted. In the structure in which the area at which the coloring layers 4 of three colors are laminated with each other is used as the shading film 13, the protective films 3 and 6 and the adhesion-improving layers 5 and 8 may be optionally used, and as the opening areas in the shading film 13, the opening areas described with reference to FIGS. 7 and 8 can be used in addition to those described with reference to FIG. 9.

Figure 11A:
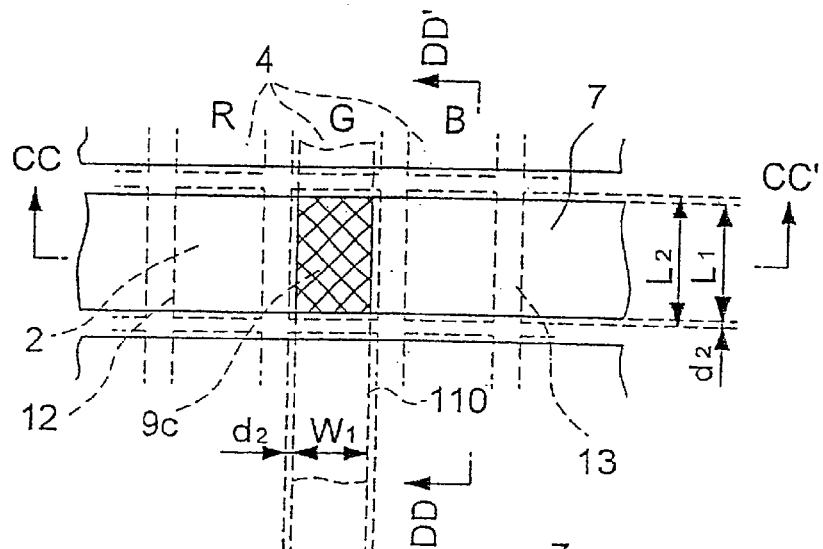
FIG. 11A is a partial plan view showing another structure of a substrate disposed at the back in the embodiment.
Figure 11B:
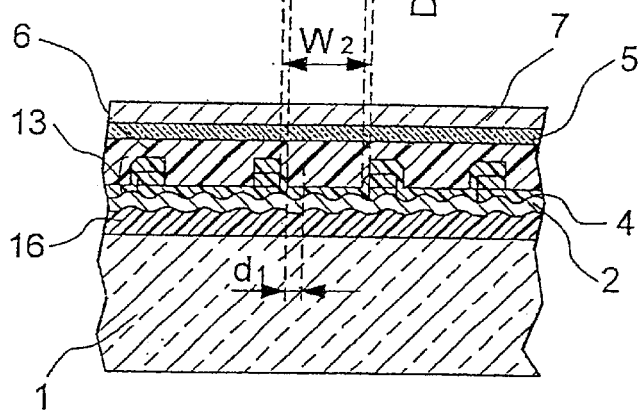
FIG. 11B is a schematic cross-sectional view taken along the line CC–CC' in FIG. 11A, in which an electrode is formed.
Figure 11C:
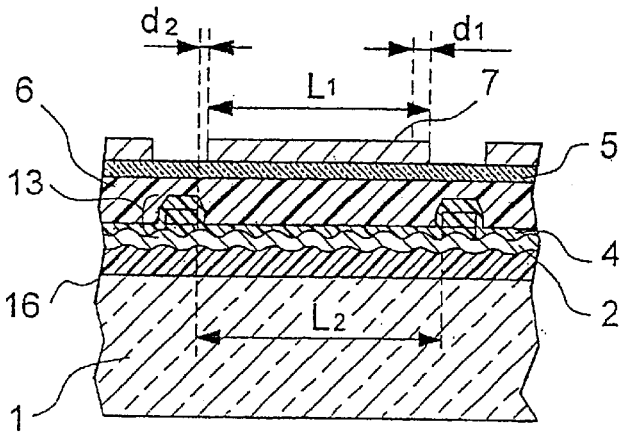
FIG. 11C is a schematic cross-sectional view taken along the line DD–DD' in FIG. 11A, in which the electrode is formed.

As the structure in which scattering properties are provided at the lower substrate 1 side, in addition to the structure shown in FIG. 6, the structures shown in FIG. 11A, FIG. 11B, and FIG. 11C can also be used. FIG. 11A is a partial plan view showing the structure in which a substrate has light scattering properties, FIG. 11B is a schematic cross-sectional view taken along the line CC–CC' in FIG. 11A, and FIG. 11C is a schematic cross-sectional view taken along the line DD–DD' in FIG. 11A.

As shown in these figures, the substrate 1 is formed which has a roughened layer 16 having a roughened surface at the upper side thereof, and the reflector 2 is formed on this roughened surface. The roughened layer 16 is formed of a photosensitive resin primarily composed of, for example, an acrylic resin, in which, after coating thereof on the substrate 1, the photosensitive resin is patterned so as to form the structure described below by a photographic method using a predetermined photo mask. That is, the roughened surface of the roughened layer 16 is patterned so as to have a random shape having peaks and bottoms in which the difference in the peak and the bottom is 0.2 to 1.5 $\mu$m, and the pitch thereof is 2 to 15 $\mu$m.

In the structure described above, the reflector 2 is formed in conformity with the roughened surface of the roughened layer 16 and reflects light incident from the upper substrate 101 side at random angles, whereby appropriate scattering properties can only be available at the lower substrate 1 side. In addition, in the structure described above, the reflector 2 has a roughened surface in conformity with the roughened surface of the roughened layer 16; however, since the surface of the reflector 2 is covered with the coloring layer 4 and the protective film 6 so that a surface above the reflector 2 is planarized, and the electrode 7 is formed on a flat surface which does not reflect the roughened surface.

In FIG. 11A, FIG. 11B, and FIG. 11C, the same references designate components previously described, and descriptions thereof are omitted. In these figures, the area at which the coloring layers 4 of three colors are laminated with each other is used as the shading film 13; however, the shading film 13 may be naturally formed of a black resin material. In addition, the protective films 3 and 6 and the adhesion-improving layers 5 and 8 may be optionally used, and as the opening areas in the shading film 13, the opening areas described with reference to FIG. 7 and FIG. 8 may be used in addition to that in FIG. 9.

Figure 12A:
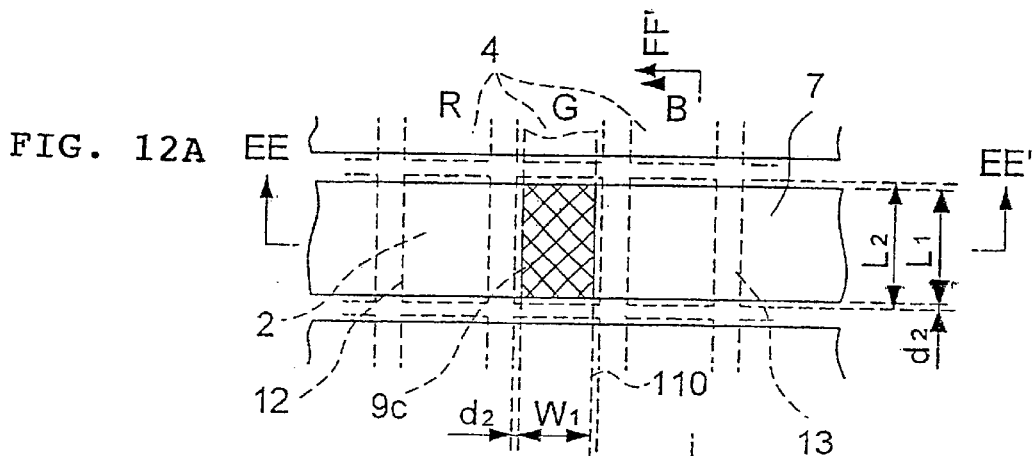
FIG. 12A is a partial plan view showing another structure of a substrate disposed at the back in the embodiment.
Figure 12B:
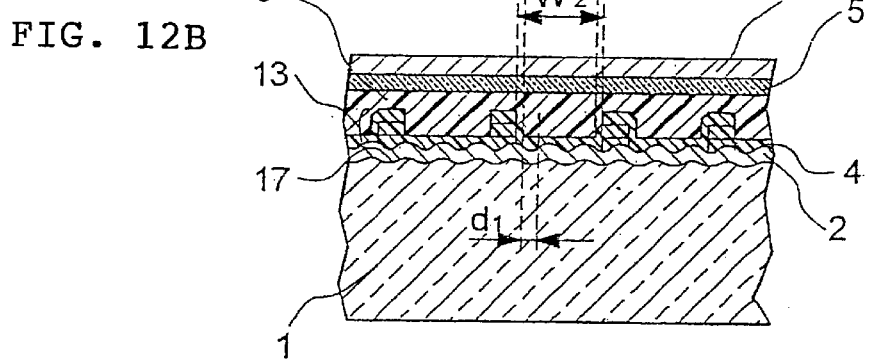
FIG. 12B is a schematic cross-sectional view taken along the line EE–EE' in FIG. 12A, in which an electrode is formed.
Figure 12C:
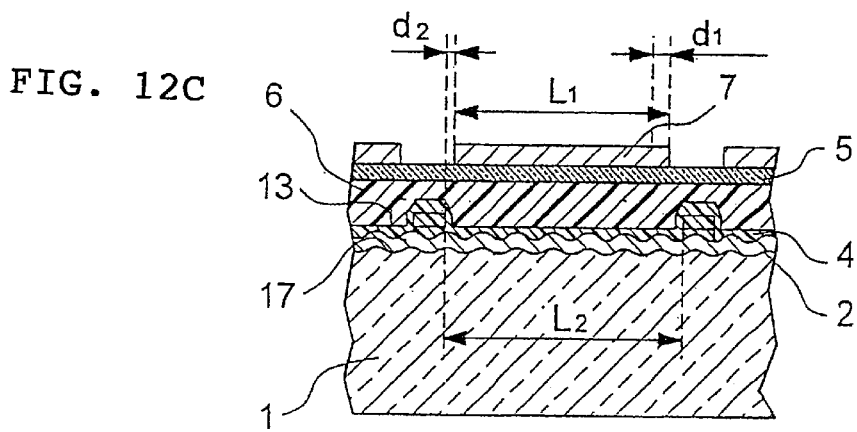
FIG. 12C is a schematic cross-sectional view taken along the line FF–FF' in FIG. 12A, in which the electrode is formed.

Furthermore, as the structure in which the lower substrate 1 side is provided with light scattering properties, the structures shown in FIG. 12A, FIG. 12B, and FIG. 12C can be used in addition to those shown in FIG. 11A, FIG. 11B, and FIG. 11C. FIG. 12A is a partial plan view showing the structure of a substrate having light scattering properties, FIG. 12B is a schematic cross-sectional view taken along the line EE–EE' in FIG. 12A, and FIG. 12C is a schematic cross-sectional view taken along the line FF–FF' in FIG. 12A.

As shown in these figures, the upper surface of the substrate 1 is directly roughened, and the reflector 2 is formed on the roughened surface 17. The roughened surface 17 of the substrate 1 can be obtained by using glass as the substrate 1 and by unevenly etching the surface thereof using a solution primarily composed of hydrofluoric acid so as to form a shape described below. That is, the surface of the substrate 1 is etched so as to have a random shape having peaks and bottoms in which the difference in the peak and the bottom is 0.05 to 2.5 μm, and the pitch thereof is 1 to 50 μm.

In the structure described above, the reflector 2 is formed in conformity with the roughened surface of the roughened layer 17 and reflects light incident from the upper substrate 101 side at random angles, whereby appropriate scattering properties can only be available at the lower substrate 1 side. In addition, in the structure described above, the reflector 2 has a roughened surface in conformity with the roughened surface of the roughened layer 17; however, since the surface of the reflector 2 is covered with the coloring layer 4 and the protective film 6 so that a surface above the reflector 2 is planarized, the electrode 7 is formed on the flat surface which does not reflect the roughened surface.

In FIG. 12A, FIG. 12B, and FIG. 12C, the same references designate components previously described, and descriptions thereof are omitted. In these figures, the area at which the coloring layers 4 of three colors are laminated with each other is used as the shading film 13; however, the shading film 13 may be naturally formed of a black resin material. In addition, the protective films 3 and 6 and the adhesion-improving layers 5 and 8 may be optionally used, and as the opening areas in the shading film 13, the opening areas described with reference to FIG. 7 and FIG. 8 may be used in addition to that shown in FIG. 9.

EMBODIMENT 2

Next, a transflective liquid crystal display device according to Embodiment 2 of the present invention will be described. In the reflective liquid crystal display device in Embodiment 1 described above, when the intensity of ambient light is sufficient, a very bright display can be displayed; however, on the other hand, when the intensity of ambient light is not sufficient, there is a problem in that the display is difficult to see.

Accordingly, the transflective liquid crystal display device according to Embodiment 2 is a display device having a reflector 2 having opening areas at individual pixels so that light incident from the back side can pass therethrough in which a reflective display is performed by light passing through the openings when ambient light is insufficient, and when ambient light is sufficient, reflective display is performed by light reflected at areas other than the openings.

Figure 13:
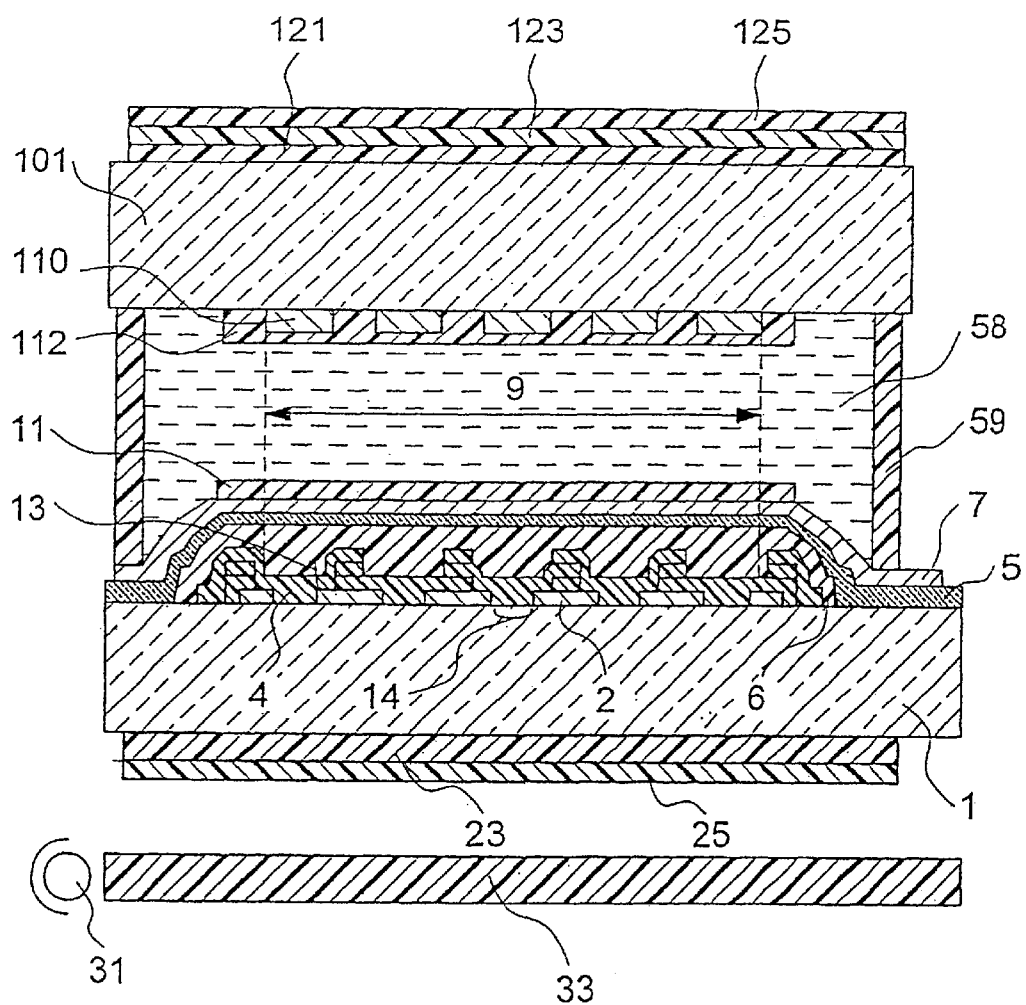
FIG. 13 is a schematic cross-sectional view showing a reflective liquid crystal display device according to a second embodiment of the present invention.

FIG. 13 is a schematic cross-sectional view showing the structure of the liquid crystal display device according to Embodiment 2. The differences of the liquid crystal display device shown in this figure from the liquid crystal display device according to Embodiment 1 in FIG. 1 are described below. The first point of difference is that there is a fluorescent lamp 31 emitting white light and an auxiliary light source including a light guide plate having one edge face disposed along the fluorescent lamp 31, the second point of difference is that there is a retardation film 23 and a polarizer 25 are sequentially provided on the substrate 1 at the outside surface thereof, the third point of difference is that openings (first openings) 14 are provided in a reflector 2 in individual opening areas in a shading film 13 so that light incident from the lower side passes therethrough, and the fourth point of difference is that areas at which coloring layers 4 of three colors are laminated with each other are used as the shading film 13.

Since other components are equivalent to those previously described, same references designate the same components, and descriptions thereof are omitted. In addition, since the fourth point of difference was previously described, the description thereof is also omitted. Accordingly, description will be made primarily focusing on the first, the second, and the third points of difference.

First, the light guide plate 33 is a transparent unit having a roughened surface for scattering formed on the entire back thereof (a lower surface in the figure) or is a transparent unit composed of an acrylic resin or the like having a printed layer for scattering formed thereon. Accordingly, when the light guide plate 33 receives light emitted from the fluorescent lamp 31 at the edge face thereof, the light guide plate 33 emits approximately uniform light to the upper side in the figure. As an auxiliary light source, a light source using an LED (light emitting diode) or EL (electroluminescence) can be used in addition to the fluorescent tube.

Next, the polarizer 25 and retardation film 23 are provided on the outside surface of the substrate 1 so that light emitted from the auxiliary light source is turned into a predetermined polarized state.

Figure 14A:
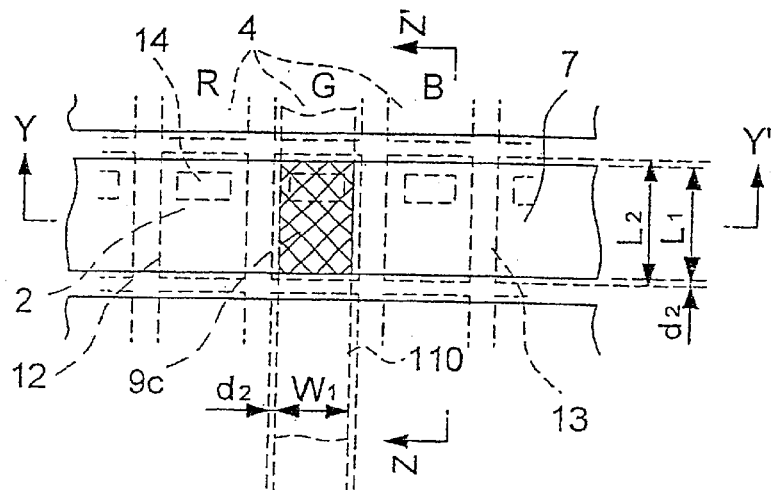
FIG. 14A is a partial plan view showing the positional relationship of an opening above a substrate disposed at the back in the embodiment.
Figure 14B:
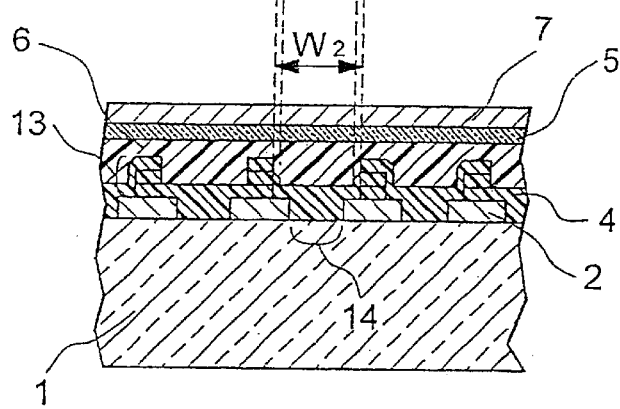
FIG. 14B is a schematic cross-sectional view taken along the line Y–Y' in FIG. 14A, in which an electrode is formed.

As shown in FIG. 14A, the opening 14 in the reflector 2 is provided in each opening area 12 in the shading film 13, i.e., in an area at which one coloring layer 4 is provided, and the opening 14 is formed by patterning a metal layer having reflective properties, such as aluminum, silver, or chromium, so as to include a display area 9 and so as to remove the metal layer disposed at which the opening 14 is to be formed. As shown in FIGS. 13 and 14B, since the coloring layer 4 is filled in the opening 14, and since light incident from the back side (a lower side in the figure) passes through the opening 14 and is emitted to the observer side (an upper side in the figure), the light is colored by the coloring layer 4. In FIG. 14A, the plan shape of the opening 14 is a rectangle; however, any shape thereof may be used.

Figure 14C:
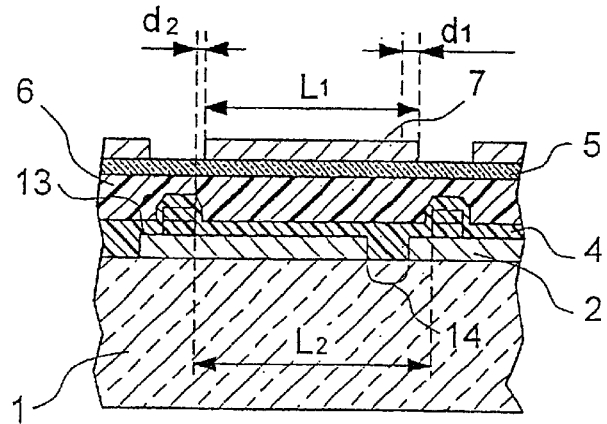
FIG. 14C is a schematic cross-sectional view taken along the line Z–Z' in FIG. 14A, in which the electrode is formed.

FIG. 14A is a view showing an interior structure of the substrate 1 in FIG. 13, and more particularly, is a view showing the positional relationship between the opening 14 in the reflector 2 and the opening area 12 in the shading film 13, FIG. 14B is a schematic cross-sectional view taken along the line Y–Y' in FIG. 14A, and FIG. 14C is a schematic cross-sectional view taken along the line Z–Z' in FIG. 14A. Since the opening area 12 in the shading film 13 was previously described, the description thereof is omitted.

In Embodiment 2, when the intensity of ambient light is sufficient, the fluorescent lamp 31 is in a turned-off state, and reflective display is performed. In reflective display, light reaches the reflector 2 via the polarizer 125, the retardation film 123, the front scattering plate 121, the substrate 101, the electrode 110, the liquid crystal layer 58, the electrode 7 and the coloring layer 4, and the light reflects at the reflector 2 and retraces its path through which it passed, so that the light is emitted from the polarizer 125 to the observer side. Since the amount of light emitted from the polarizer 125 is controlled in accordance with a voltage applied to the liquid crystal layer 58 by the electrodes 7 and 110 so as to be in a bright state, a dark state, or an intermediate state therebetween, a desired display can be performed by controlling the applied voltage to the liquid crystal layer 58.

In contrast, when ambient light is insufficient, the fluorescent lamp 31 is in a turned-on state, and transmissive display is performed. In transmissive display, light emitted from the fluorescent lamp 31 and the light guide plate 33 is in a predetermined polarized state by passing through the polarizer 25 and the retardation film 23 and is then emitted at the polarizer 125 to the observer side via the substrate 1, the openings 14, the electrode 7, the liquid crystal layer 58, and the electrode 110. As is the case with transmissive display, since the amount of light emitted from the polarizer 125 is controlled in accordance with a voltage applied to the liquid crystal layer 58 by the electrodes 7 and 110 so as to be in a bright state, a dark state, or an intermediate state therebetween, a desired display can be performed by controlling the applied voltage to the liquid crystal layer 58.

In this liquid crystal display device, since the liquid crystal layer 58 is provided between the electrodes 7 and 110 which are formed of the same ITO, display quality and long-term reliability are not degraded. In addition, the shading film 13 and the coloring layer 4 are formed on the reflector 2, so that the reflector 2 is not exposed. Accordingly, in a manufacturing process of the liquid crystal display device, the reflector 2 is not exposed to chemical reagents, gases, liquid crystal, and the like, and damage to the reflector 2 can be suppressed. Furthermore, since the coloring layer 4 is formed so as to cover the shading film 13, the surface reflection at the shading film 13 is not only suppressed, but also, the optical density required for the shading film 13 can be less. For example, since light passes through the shading film twice in reflective display, the practical optical density of the shading film 13 can be less, and in transmissive display, since light is not determined by the shading film 13 but is determined by the reflector 2, the optical density of the shading film 13 has nearly no influence in transmissive display. Consequently, according to this embodiment, bright and high quality display suppressing decrease in contrast ratio can be performed both in transmissive display and reflective display.

In a conventional structure in which a reflector is also used as an electrode, when openings are provided in the reflector, since a voltage is not applied to a liquid crystal layer at which the openings are provided, areas (not contributing to display) are generated at which liquid crystal molecules are not normally driven. On the other hand, in the embodiment, since the reflector 2 and the electrode 7 are independent to each other, and the electrode 7 can be provided at a place corresponding to the opening 14, liquid crystal molecules at the opening 14 are normally driven. Accordingly, for the reasons described above, decrease in contrast ratio in transmissive display can be suppressed.

In this connection, the structure of the substrate 1 in Embodiment 2 is not limited to those shown in FIG. 13, FIG. 14, and the like, and various embodiments can be used. Accordingly, some of the various embodiments will be described.

Figure 15A:
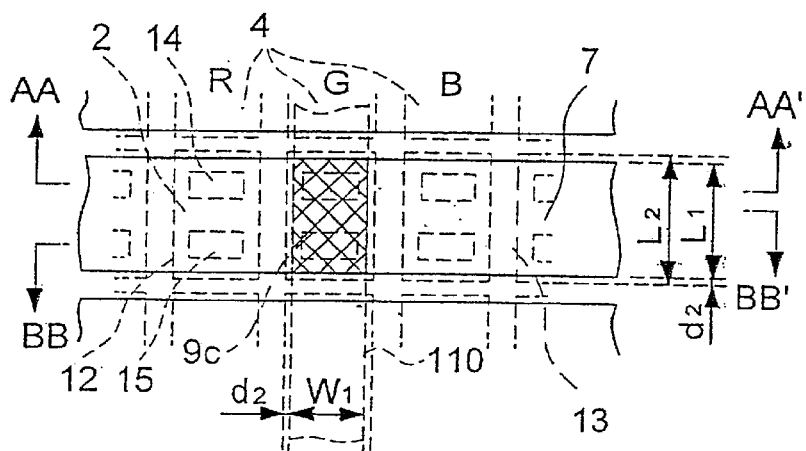
FIG. 15A is a partial plan view showing a structure applicable to a substrate disposed at the back side in the embodiment.
Figure 15B:
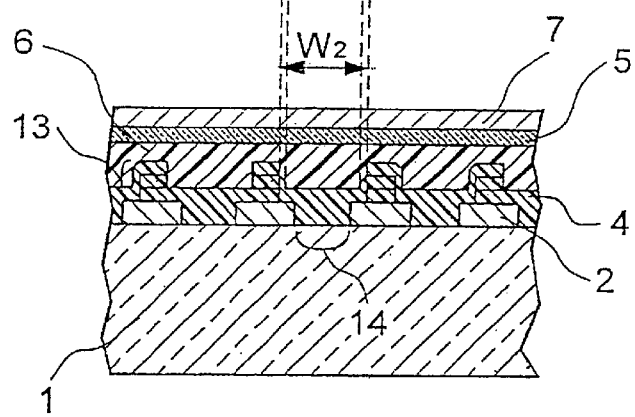
FIG. 15B is a schematic cross-sectional view taken along the line AA–AA' in FIG. 15A.
Figure 15C:
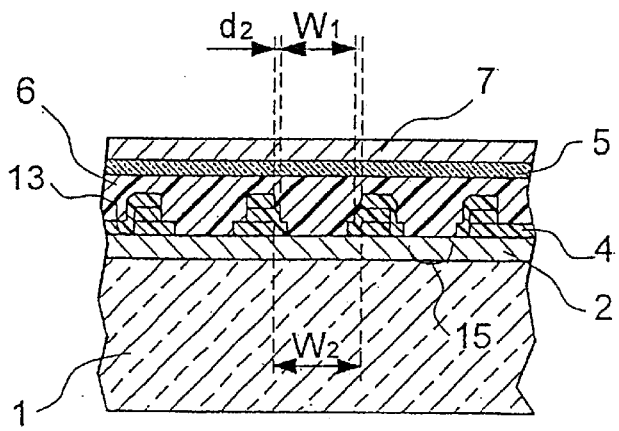
FIG. 15C is a schematic cross-sectional view taken along the line BB–BB' in FIG. 15A.

The embodiment will be described with reference to FIG. 15A, FIG. 15B, and FIG. 15C. FIG. 15A is a partial plan view showing a substrate of the embodiment in which an electrode 7 is formed, FIG. 15B is a schematic cross-sectional view taken along the line AA–AA' in FIG. 15A, and FIG. 15C is a schematic cross-sectional view taken along the line BB–BB' in FIG. 15A.

As shown in these figures, two openings 14 and 15 are provided in one pixel. Among these two openings, concerning the opening 14, as shown in FIG. 13, FIG. 14B, and FIG. 14C, a coloring layer 4 is filled in the opening 14 formed above the substrate 1 on which a reflector 2 is not present, and the opening 15 (second opening) is formed above the reflector 2 at which the coloring layer 4 is not provided, as shown in FIG. 15C. That is, the opening 15 is formed so as to expose the reflector 2 in a step of forming the coloring layer 4. In particular, when photosensitive color resists R (red), G (green), and B (blue) are sequentially formed by a color resist method, the color resists are formed so as not to remain at a place at which the opening 15 is to be formed, whereby the opening 15 is formed.

Figure 16A:
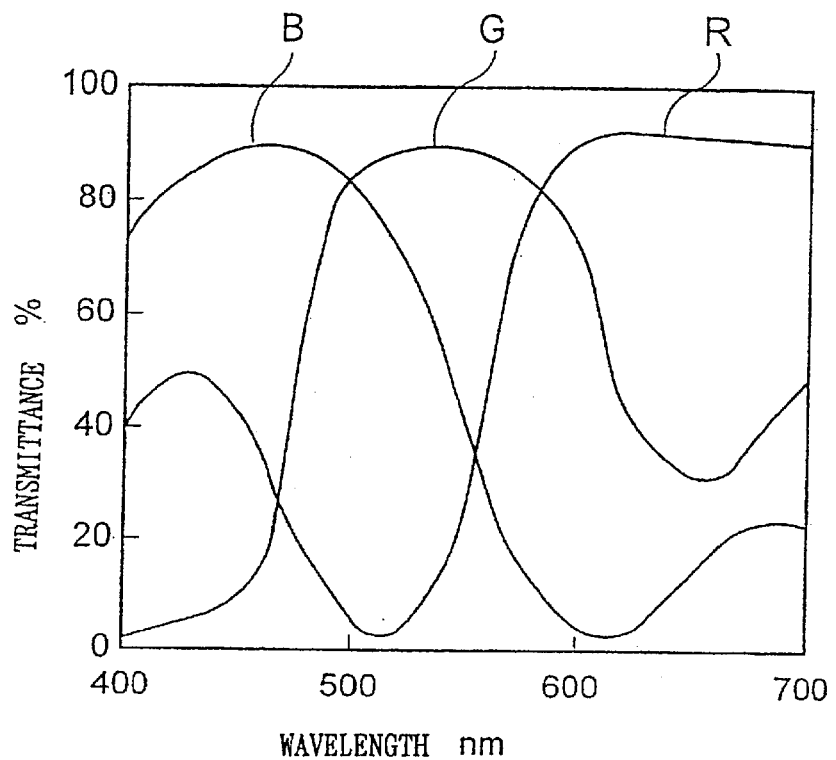
FIG. 16A is a graph showing color properties of individual coloring layers having respective colors in transmissive display.
Figure 16B:
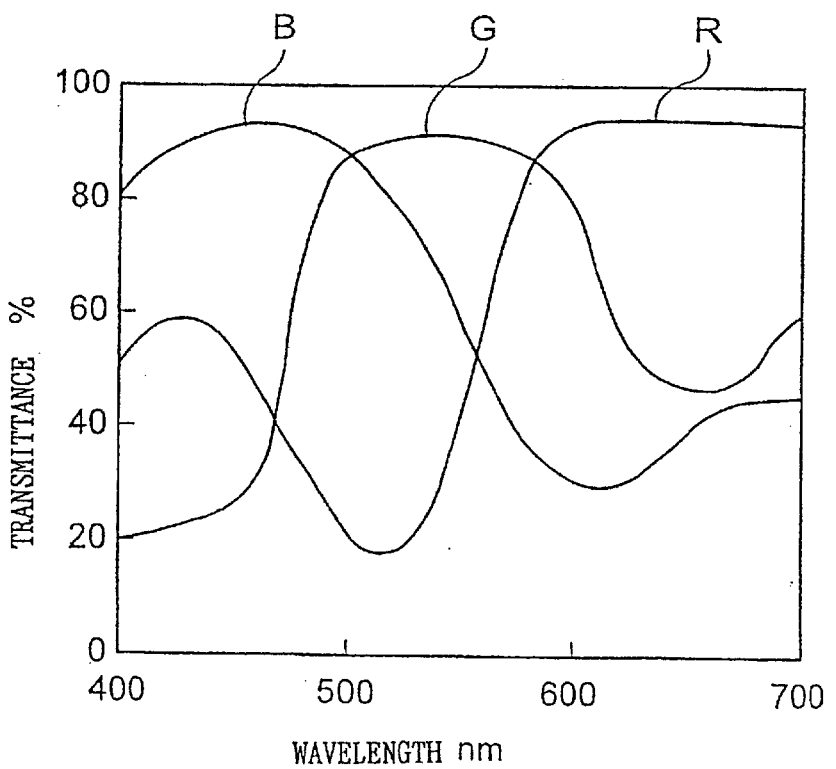
FIG. 16B is a graph showing color properties of individual coloring layers having respective colors in reflective display.

An area of the opening 15, which is not filled with the coloring layer 4, is determined as described below with respect to an area of the opening area 12 in the shading film 13 deducted by the area of the opening 14 (that is, an effective area in reflective display functioning as one pixel). That is, when preferable light transmissive properties of a coloring layer in a transmissive display is shown in FIG. 16A, and when preferable light transmissive properties of a coloring layer in reflective display is shown in FIG. 16B, first, the coloring layer 4 is formed so that properties obtained by light only passing through the opening 14 are equivalent to those shown in FIG. 16A. Second, the area of the opening 15 is preferably determined in accordance with the individual colors so that average light has the properties equivalent to those shown in FIG. 16B, in which the average light is obtained by light, which is reflected at the area of the opening area 12 deducted by the opening area 14 and is colored by each coloring layer 4, and light, which is reflected at the opening area 15 and is not colored. The properties of individual colors shown in FIG. 16A and FIG. 16B are just examples, they are appropriately changed in accordance with liquid crystal display modes to be used, transmittances, and color densities.

According to the embodiment described above, since color properties of light can be optimized for both reflective display and transmissive display, superior color reproducibility for both types of display can be realized.

Figure 17A:
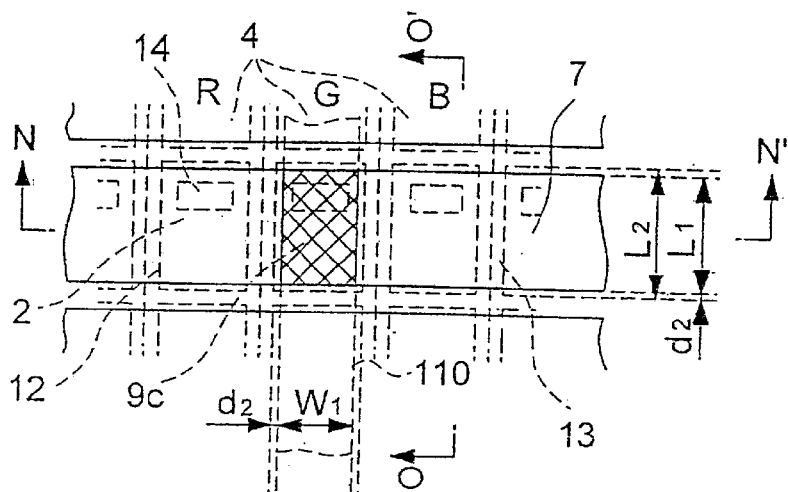
FIG. 17A is a partial plan view showing the positional relationship of an opening in an example of a substrate disposed at the back in the embodiment.
Figure 17B:
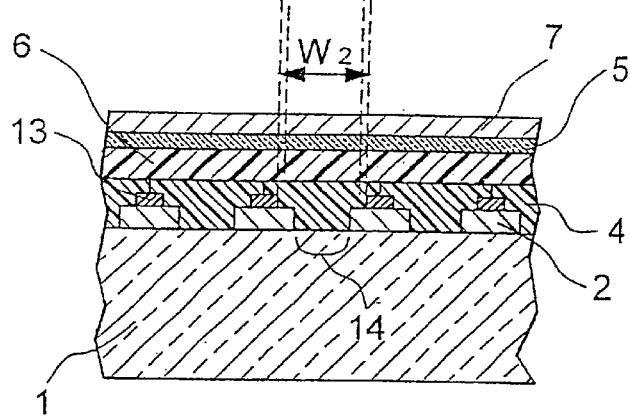
FIG. 17B is a schematic cross-sectional view taken along the line N–N' in FIG. 17A.
Figure 17C:
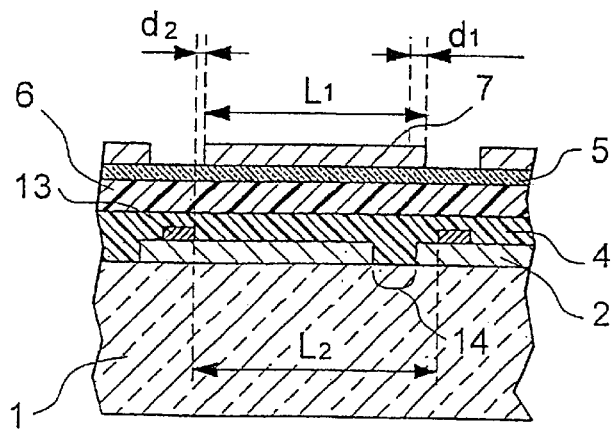
FIG. 17C is a schematic cross-sectional view taken along the line O–O' in FIG. 17A.

In Embodiment 2, the area at which the coloring layers 4 of three colors are laminated with each other is used as the shading film 13; however, as shown in FIG. 17A, FIG. 17B, and FIG. 17C, a black resin material may be naturally used.

In addition, as a substrate disposed at the back side in Embodiment 2, the substrates shown in FIG. 14A, FIG. 15A, and FIG. 17A optionally provided with individual components described in Embodiment 1 can also be used. For example, the protective layer 3 and 6 the adhesion-improving layer 5 and 8 may be optionally selected and applied thereto, or structures may be used in which the reflector 2 may be formed to the roughened surface 16 in FIG. 11B or the roughened surface 17 in FIG. 12B, and the opening areas 14 and 15 may be then formed therein.

Electronic Apparatus

Next, electronic apparatuses using the liquid crystal display devices according to Embodiment 1, Embodiment 2, and Application Examples will be described. As described above, the liquid crystal display devices are preferably used for mobile apparatuses which are used in various environments and are required to have low power consumption.

Figure 18A:
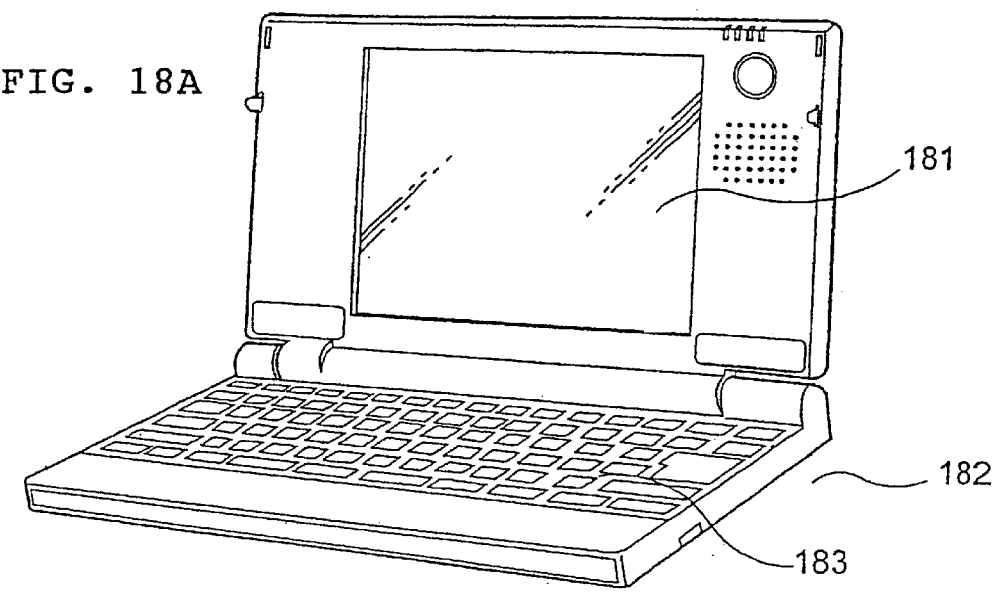
FIG. 18A is a perspective view showing a structure of a mobile information apparatus using a liquid crystal display device according to an embodiment.

FIG. 18A is a perspective view showing the structure of a mobile information apparatus in which a display unit 181 of the embodiment and an input unit 183 are provided at the upper part and at the lower part of the apparatus body, respectively. In general, a touch panel is provided in the front face of the display unit in many cases. Common touch panels are difficult to see since substantial reflection occurs at the surfaces thereof. Accordingly, even for portable types, transmissive liquid crystal display devices are conventionally used in many cases. However, since the transmissive liquid crystal display device always uses an auxiliary light source, the power consumption thereof is large, and the life of the battery therefor is short. Compared to the case described above, the liquid crystal display devices of the embodiments can be used as mobile information apparatuses since clear and bright display can be obtained in either reflective display or transflective display.

Figure 18B:
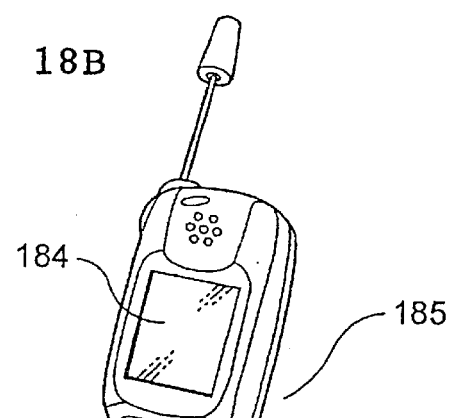
FIG. 18B is a perspective view showing a structure of a mobile phone using a liquid crystal display device according to an embodiment.

FIG. 18B is a perspective view showing the structure of a mobile phone in which a display unit 184 of the embodiment is provided at an upper part of the front face of the mobile phone body. The mobile phones are used in various environments, both indoors and outdoors. In particular, the mobile phones are used in cars in many cases; however, the interiors of cars at night are very dark. Accordingly, as the display device 184, a transflective liquid crystal display device, i.e., the liquid crystal display device according to Embodiment 2, is preferable in which a reflective display having low power consumption can be primarily used, and when necessary, a transmissive display can be used by utilizing an auxiliary light. In the liquid crystal display device 184, brighter and superior quality display provided with higher contrast ratio can be produced in both reflective display and transmissive display than can be produced by a conventional liquid crystal display device.

Figure 18C:
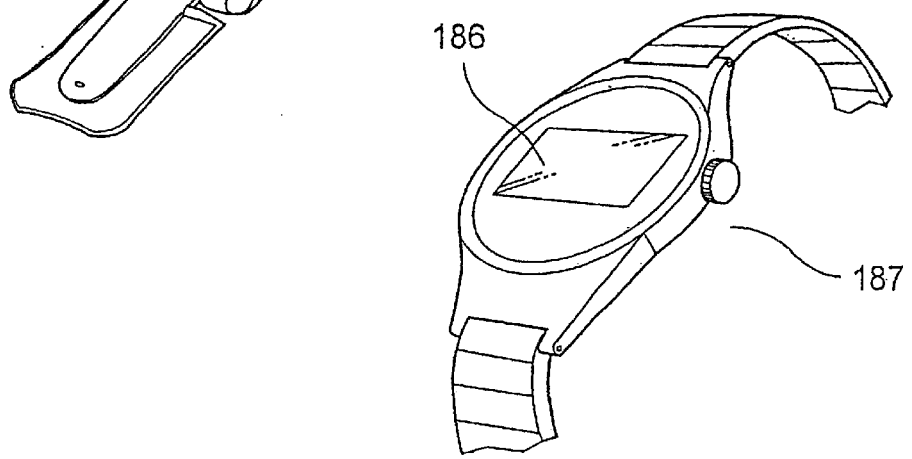
FIG. 18C is a perspective view showing a structure of a watch using a liquid crystal display device according to an embodiment.

FIG. 18C is a perspective view showing the structure of a watch as an example of electronic apparatuses. A display unit 186 according to the embodiment is provided at the center of the watch body. An important point in application to watches is superior styling. The liquid crystal display device 184 according to the embodiment is bright and has high contrast, and in addition, the coloration is reduced since characteristic changes due to wavelength of light are small. Hence, compared to a conventional liquid crystal display device, a display provided with significantly superior styling can be obtained.

What is claimed is:

1. A liquid crystal display device having a liquid crystal layer provided between a first transparent electrode formed on a first substrate side and a second transparent electrode formed on a second substrate side, comprising:
    a reflector formed on a surface of the second substrate at the liquid crystal layer side so as to reflect at least light incident from the first substrate side;
    a shading film formed above a surface of the second substrate at the liquid crystal layer side so as to have an opening area corresponding to an intersection area at which the first transparent electrode and the second transparent electrode intersect each other; and
    a coloring layer formed above a surface of the second substrate at the liquid crystal layer side so as to cover the shading film;
    wherein the reflector is provided with a first opening in the opening area in the shading film so as to allow light to pass therethrough.

2. The liquid crystal display device according to claim 1, further comprising a first film provided between the reflector and the surface of the second substrate at the liquid crystal layer side.

3. The liquid crystal display device according to claim 1, wherein the shading film is composed of a black resin material.

4. The liquid crystal display device according to claim 1, wherein the shading film is formed by laminating the coloring layers of at least two colors.

5. The liquid crystal display device according to claim 1, wherein the optical density of the shading film is 0.5 to 1.7.

6. The liquid crystal display device according to claim 1, further comprising a second film provided so as to cover at least the surface of the reflector.

7. The liquid crystal display device according to claim 6, wherein the second transparent electrode is formed on third film which improves adhesive properties.

8. The liquid crystal display device according to claim 7, further comprising a fourth film formed so as to cover the coloring layer, and an second opening provided in the coloring layer at the opening area in the shading film.

9. The liquid crystal display device according to claim 7, further comprising a fourth film formed so as to cover the coloring layer.

10. The liquid crystal display device according to claim 9, wherein the fourth film has light scattering properties.

11. The liquid crystal display device according to claim 9, wherein the reflector is formed on a roughened surface of the second substrate at the liquid crystal layer side.

12. The liquid crystal display device according to claim 11, wherein the roughened surface is a surface of a resin material formed on the surface of the second substrate at the liquid crystal layer side.

13. The liquid crystal display device according to claim 11, wherein the roughened surface is a surface formed by a roughening treatment of the surface of the second substrate at the liquid crystal layer side.

14. An electronic apparatus comprising a liquid crystal display device according to claim 13.

15. A liquid crystal display device having a liquid crystal layer provided between a first transparent electrode formed on a first substrate side and a second transparent electrode formed on a second substrate side, comprising:
    a reflector formed on a surface of the second substrate at the liquid crystal layer side so as to reflect at least light incident from the first substrate side;
    a shading film formed above a surface of the second substrate at the liquid crystal layer side so as to have an opening area corresponding to an intersection area at which the first transparent electrode and the second transparent electrode intersect each other; and
    a coloring layer formed above a surface of the second substrate at the liquid crystal layer side so as to cover the shading film;
    wherein, with respect to the intersection area of the first transparent electrode and the second transparent electrode the opening area in the shading film is expanded toward the outside from the periphery of the intersection area by at most approximately a half of the distance between the first transparent electrode and the second transparent electrode.

16. A liquid crystal display device having a liquid crystal layer provided between a first transparent electrode formed on a first substrate side and a second transparent electrode formed on a second substrate side, comprising:
    a reflector formed on a surface of the second substrate at the liquid crystal layer side so as to reflect at least light incident from the first substrate side;
    a shading film formed above a surface of the second substrate at the liquid crystal layer side so as to have an opening area corresponding to an intersection area at which the first transparent electrode and the second transparent electrode intersect each other;
    a coloring layer formed above a surface of the second substrate at the liquid crystal layer side so as to cover the shading film;

a second film provided so as to cover at least the surface of the reflector;

the second transparent electrode being formed on a third film which improves adhesive properties; and a fourth film formed so as to cover the coloring layer, the fourth film having light scattering properties;

wherein the fourth film is composed of a resin material comprising particles having a refractive index differing from that of the resin material and having a diameter smaller than the thickness of the fourth film.

17. A substrate for a liquid crystal display device being on the opposite side to the observer side of a pair of substrates, the pair of substrates having a liquid crystal layer provided therebetween, comprising:

a reflector formed on a surface of the substrate at the liquid crystal layer side so as to reflect at least light incident from the observer side;

a shading film formed above the surface of the substrate at the liquid crystal layer side so as to have an opening area above the reflector;

a coloring layer formed above the surface of the substrate at the liquid crystal layer side so as to cover the shading film; and a transparent electrode formed above the coloring layer;

wherein, in the opening area in the shading film, the reflector is provided with a first opening so as to allow light to pass therethrough.

18. The substrate for a liquid crystal display device according to claim 17, further comprising a first film provided between the reflector and the surface of the second substrate at the liquid crystal layer side.

19. The substrate for a liquid crystal display device according to claim 17, wherein the shading film is composed of a black resin material, and the optical density thereof is 0.5 to 1.7.

20. The substrate for a liquid crystal display device according to claim 17, wherein the shading film is formed by laminating the coloring layers of at least two colors, and the optical density of the shading film is 0.5 to 1.7.

21. The substrate for a liquid crystal device according to claim 18, further comprising a second film provided so as to cover at least the surface of the reflector.

22. The substrate for a liquid crystal display device according to claim 21, wherein the transparent electrode is formed on a third film which improves adhesive properties.

23. The substrate for a liquid crystal display device according to claim 22, further comprising a fourth film formed so as to cover the coloring layer, and a second opening provided in the coloring layer at the opening area in the shading film.

24. The substrate for a liquid crystal display device according to claim 22, further comprising a fourth film formed so as to cover the coloring layer.

25. The substrate for a liquid crystal display device according to claim 24, wherein the fourth film has light scattering properties.

26. The substrate for a liquid crystal display device according to claim 21, wherein the reflector is formed on a roughened surface of the substrate at the liquid crystal layer side.

27. The substrate for a liquid crystal display device according to claim 26, wherein the roughened surface is a surface of a resin material formed on the surface of the substrate at the liquid crystal layer side.

28. The substrate for a liquid crystal display device according to claim 26, wherein the roughened surface is a surface formed by a roughening treatment of the surface of the substrate at the liquid crystal layer side.

29. A substrate for a liquid crystal display device being on the opposite side to the observer side of a pair of substrates, the pair of substrates having a liquid crystal layer provided therebetween, comprising:

a reflector formed on a surface of the substrate at the liquid crystal layer side so as to reflect at least light incident from the observer side;

a shading film formed above the surface of the substrate at the liquid crystal layer side so as to have an opening area above the reflector;

a coloring layer formed above the surface of the substrate at the liquid crystal layer side so as to cover the shading film;

a transparent electrode formed above the coloring layer;

a second film provided so as to cover at least the surface of the reflector;

the transparent electrode being formed on a third film which improves adhesive properties;

a fourth film formed so as to cover the coloring layer, and a second opening provided in the coloring layer at the opening area in the shading film; and a fourth film formed so as to cover the coloring layer, the fourth film having light scattering properties;

wherein the fourth film is composed of a resin material containing particles having a refractive index differing from that of the resin material and having a diameter smaller than the thickness of the fourth film.

* * * * *

UNITED STATES PATENT AND TRADEMARK OFFICE
CERTIFICATE OF CORRECTION

PATENT NO. : 6,608,660 B1
DATED : August 19, 2003
INVENTOR(S) : Eiji Okamoto, Takumi Seki and Keiji Takizawa It is certified that error appears in the above-identified patent and that said Letters Patent is hereby corrected as shown below:

<u>Title page,</u>
Item [54], Title, should be: -- LIQUID CRYSTAL DISPLAY DEVICE WITH A SHADING LAYER HAVING AN OPENING FORMED THEREIN --

<u>Column 8,</u>
Line 22, "has" should be -- have --

<u>Column 13,</u>
Line 12, "G-GG'" should be -- GG-GG' --

<u>Column 24,</u>
Lines 50 and 51, "layer" should be -- layers --

<u>Column 26,</u>
Line 11, "an" should be -- a --

<u>Column 27,</u>
Line 42, after "crystal" insert -- display --

<u>Column 28,</u>
Line 10, "claim 21" should be -- claim 24 --

Signed and Sealed this

Eleventh Day of May, 2004

JON W. DUDAS
*Acting Director of the United States Patent and Trademark Office*